US010545947B2

(12) United States Patent
Tuatini et al.

(10) Patent No.: US 10,545,947 B2
(45) Date of Patent: Jan. 28, 2020

(54) MESSAGE PERSONALIZATION OVER MULTIPLE INTERNET MESSAGING CAMPAIGNS

(71) Applicant: ORACLE INTERNATIONAL CORPORATION, Redwood Shores, CA (US)

(72) Inventors: Jeffrey Taihana Tuatini, Greenbrae, CA (US); Bradley Harold Sergeant, Portland, OR (US); Raghu Upadhyayula, Dublin, CA (US); Qing Zou, Sunnyvale, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 845 days.

(21) Appl. No.: 14/798,354

(22) Filed: Jul. 13, 2015

(65) Prior Publication Data

US 2016/0012493 A1 Jan. 14, 2016

Related U.S. Application Data

(60) Provisional application No. 62/026,483, filed on Jul. 18, 2014, provisional application No. 62/024,435, filed on Jul. 14, 2014.

(51) Int. Cl.
*G06F 16/23* (2019.01)
*G06Q 30/02* (2012.01)
(Continued)

(52) U.S. Cl.
CPC .... *G06F 16/2365* (2019.01); *G06F 16/24539* (2019.01); *G06F 16/284* (2019.01); *G06Q 30/0271* (2013.01)

(58) Field of Classification Search
CPC .......... G06F 17/30595; G06F 16/2365; G06F 16/24539; G06F 16/284; G06Q 30/0271
See application file for complete search history.

(56) References Cited

U.S. PATENT DOCUMENTS 1,092,006 A 3/1914 Bailey
3,218,663 A 11/1965 Joseph
(Continued)

FOREIGN PATENT DOCUMENTS

WO 03036420 A2 5/2003

OTHER PUBLICATIONS

Cohen et al., "Refreshment policies for Web content caches", Computer Networks, Nov. 8, 2001, 14 pages.
(Continued)

*Primary Examiner* — Mario C. Iosif
(74) *Attorney, Agent, or Firm* — Potomac Law Group, PLLC

(57) ABSTRACT

Systems for prosecuting Internet messaging campaigns. Two or more data sources are determined where at least one of the data sources comprise demographic attributes corresponding to shared IDs such as recipient IDs. A first join operation is performed over matching instances of the shared IDs in the two or more data sources. The first join operation results in a personalization table comprising rows having at least recipient IDs, respective external addresses, and at least one of the demographic attributes. The personalization table is transformed into a key-value data structure that is published to a caching subsystem. The caching subsystem is used to select a first set of recipients determined without performing a second join operation. Personalized messages to at least some of the first and second set of recipients are formed using the message template and the key-value data structures.

20 Claims, 14 Drawing Sheets

200
Marketing Campaign Template Commands 213
Data Publisher Module 165
Metadata Publisher
Join Operation
Selected Table1 229₁
Selected Table2 229₂
Personalization Table 231
Marketing Campaign Templates 223
Marketing Campaign Template Commands 213
Customer Databases 168
Channel Engine 162
Communications Partner Systems
Personalized Messages 113
Personalization Applications 212
Cache Data Updates 228
Lookup API 206
Query API 208
IODP 166
IDR 167
Metadata Database 230
Multi-Level In-Memory Cache 204 (key-value data structure)
Data Source1 215
Data Source2 217
228
Published Data 214
Published Metadata 216
Flow 202
Analyze campaign for personalization data tables
Join and publish personalization tables to a cache system
Launch first campaign
Personalize and send for first campaign
Launch second campaign
Personalize and send for second campaign

(51) Int. Cl.
*G06F 16/28* (2019.01)
*G06F 16/2453* (2019.01)

(56) References Cited

U.S. PATENT DOCUMENTS 5,826,239 A 10/1998 Du et al.
6,665,677 B1 * 12/2003 Wotring ............ G06F 17/30569
7,132,015 B2 11/2006 Wen et al.
7,756,256 B1 7/2010 Rukman et al.
7,873,376 B2 1/2011 Coelho
8,090,612 B2 1/2012 Chao et al.
8,417,678 B2 4/2013 Bone et al.
8,510,264 B1 8/2013 Tamm et al.
8,719,225 B1 5/2014 Rath
8,771,662 B2 7/2014 Zhao et al.
8,775,448 B2 7/2014 Tuatini et al.
8,839,256 B2 10/2014 Sample
8,869,256 B2 10/2014 Sample et al.
9,031,586 B1 5/2015 Kilpatrick et al.
9,247,401 B2 1/2016 Lauder
9,754,265 B2 9/2017 Seelig
2003/0144898 A1 7/2003 Bibelnieks et al.
2003/0195862 A1 * 10/2003 Harrell, Jr. .......... G06F 17/3056
2004/0015504 A1 1/2004 Ahad et al.
2004/0204973 A1 10/2004 Witting et al.
2005/0071252 A1 * 3/2005 Henning ................ G06Q 30/02 705/26.1
2005/0192986 A1 9/2005 Butler
2005/0259575 A1 11/2005 Krishnamurthi et al.
2006/0053181 A1 3/2006 Anand et al.
2006/0190355 A1 * 8/2006 Jammes ................. G06Q 30/02 705/27.1
2006/0253318 A1 11/2006 Ramsey et al.
2007/0100783 A1 * 5/2007 Cialini .................. G06F 16/217
2007/0156842 A1 7/2007 Vermeulen et al.
2007/0208602 A1 9/2007 Nocera et al.
2007/0250505 A1 10/2007 Yan et al.
2008/0040191 A1 2/2008 Chakravarty et al.
2008/0065435 A1 3/2008 Ratzloff
2008/0027788 A1 8/2008 Lawrence
2008/0262925 A1 10/2008 Kim et al.
2009/0063474 A1 * 3/2009 Curry ................ G06F 17/30887
2009/0076908 A1 * 3/2009 Ingleshwar ............ G06Q 30/02 705/14.69
2010/0070448 A1 3/2010 Omoigui
2010/0250477 A1 9/2010 Yadav
2010/0274661 A1 10/2010 Aaltonen et al.
2011/0016123 A1 * 1/2011 Pandey ............ G06F 17/30348 707/737
2011/0099152 A1 4/2011 Law et al.
2011/0282735 A1 11/2011 Kordis et al.
2012/0130802 A1 5/2012 Shimizu
2012/0173340 A1 7/2012 Zhao
2012/0191546 A1 7/2012 Phelan
2013/0282837 A1 10/2013 Mayala et al.
2014/0025763 A1 1/2014 Furlong et al.
2014/0181039 A1 6/2014 Harrison et al.
2014/0181579 A1 6/2014 Whitehead et al.
2015/0026236 A1 1/2015 Solter et al.
2015/0038181 A1 2/2015 Magadevan et al.
2015/0294349 A1 10/2015 Capel et al.

OTHER PUBLICATIONS

Simitsis, “Optimizing Analytic Data Flows for Multiple Execution Engines”, May 20-24, 2012.

Chemolli, SquidFaq, InnerWorkings, Squid Web Proxy Wiki, Oct. 27, 2013, 17 pages.

Twilio, Inc., “TwiML Message: Twilio’s Request”, Mar. 26, 2013, 2 pages.

Mobivate, “psms aggregator”, Jan. 14, 2013, 3 pages.

Ford, “IT Research BYTE LOL: Laugh out Loud or Lots of Love?”, Integrating SMS into Ford Business Processes, Jun. 25, 2010, 6 pages.

ExactTarget, “SMS Marketing Term of the Day: Aggregator”, Jun. 30, 2009, 3 pages.

Aruhat, “SMS Aggregators: Make sure that your gateways are the best used to give Excellent Services”, Mar. 28, 2014, 6 pages.

FrancescoChemolli, SquidFaq, InnerWorkings, Squid Web Proxy Wiki, Oct. 27, 2013, 17 pages.

Tata Communications, “Mobile Messaging Exchange”, 2013, 2 pages.

* cited by examiner

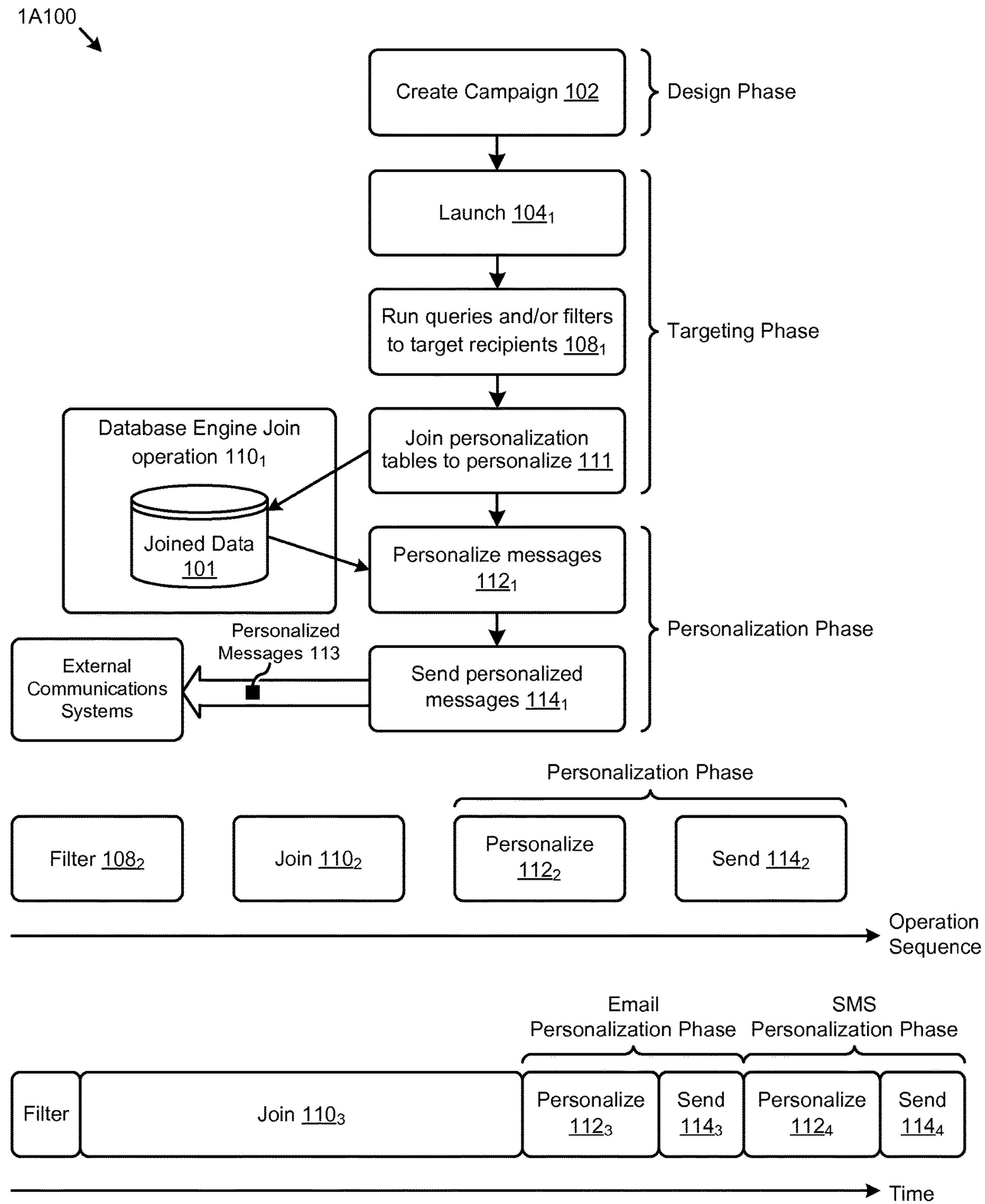
FIG. 1A1

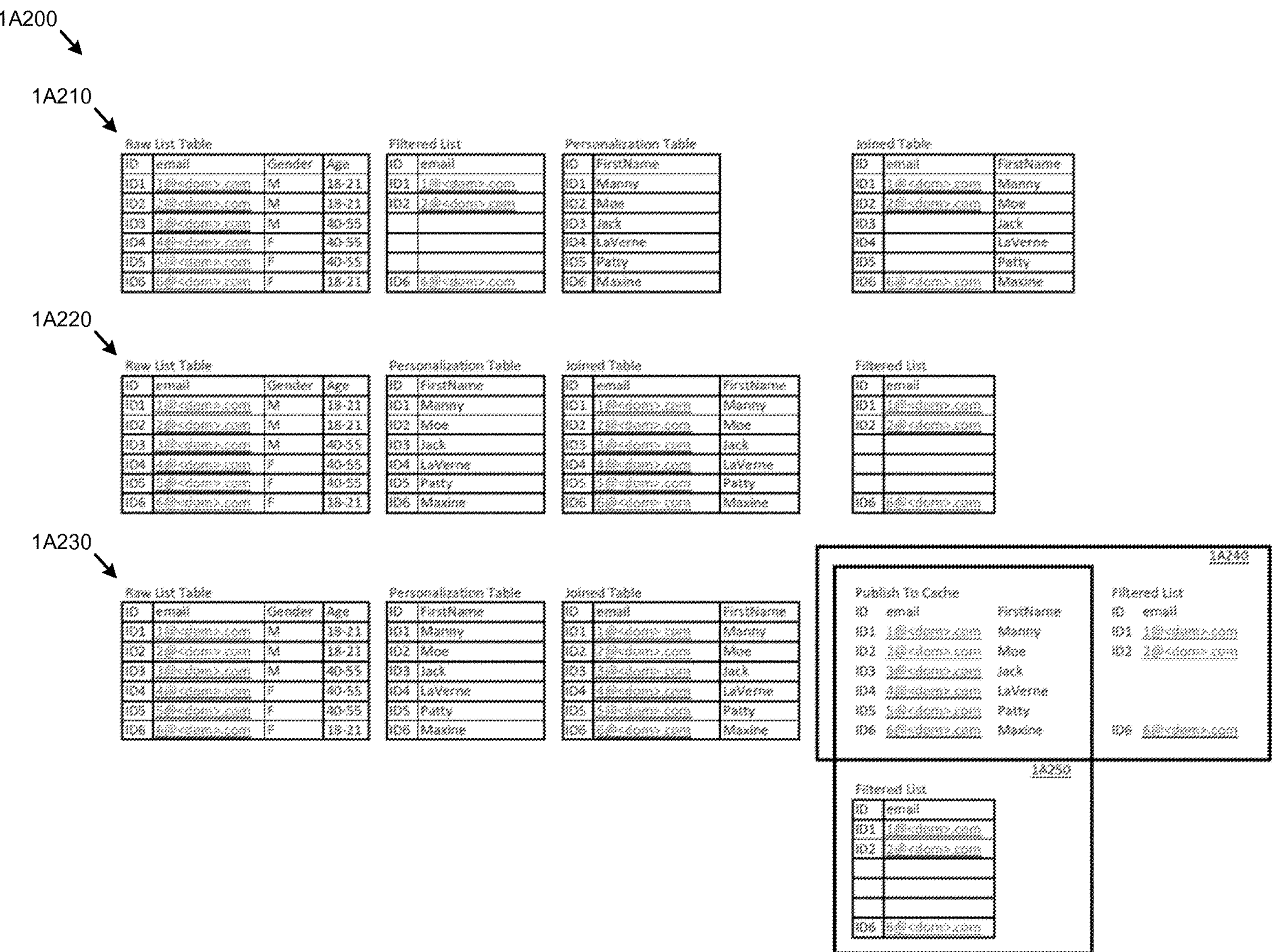
FIG. 1A2

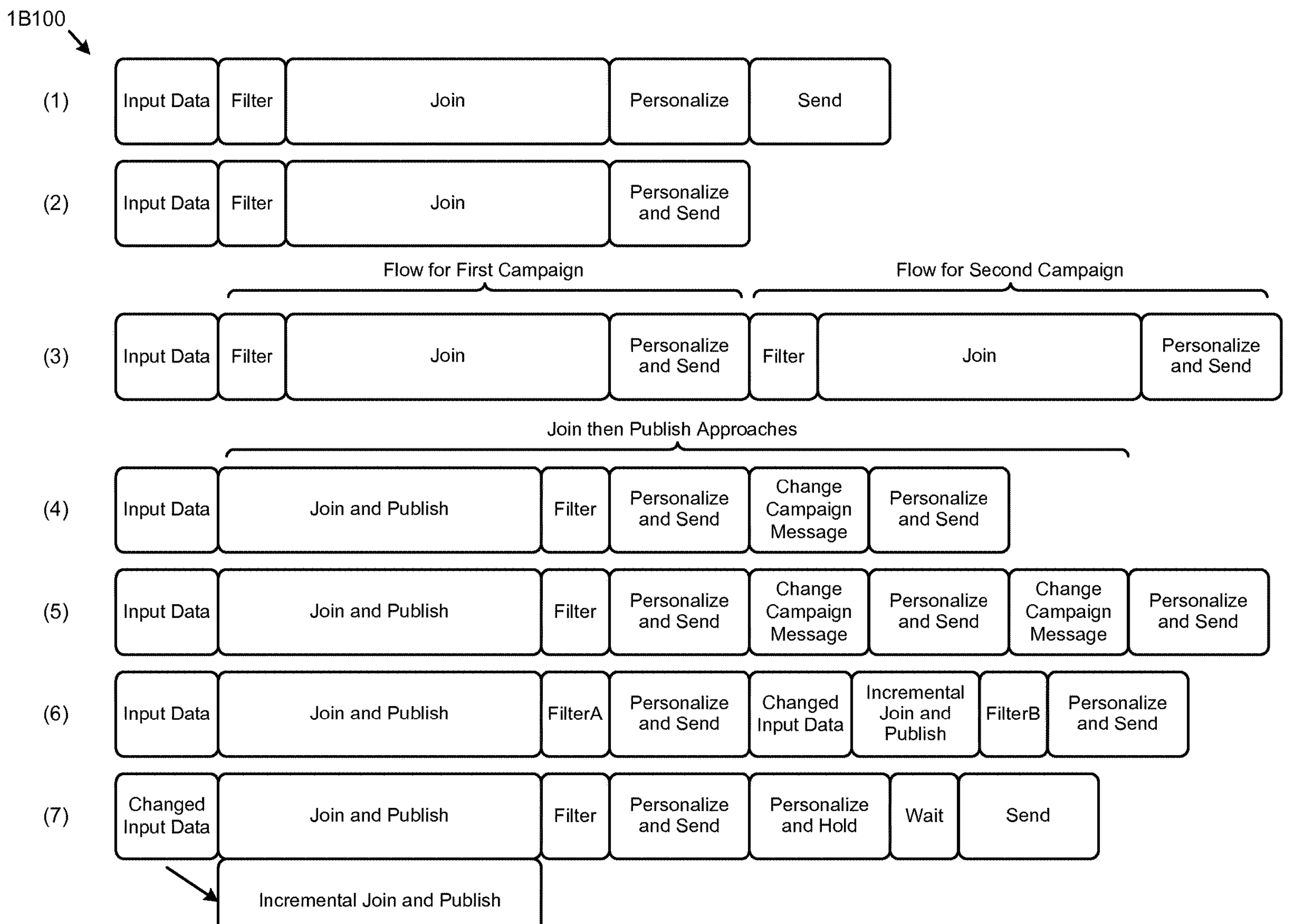
FIG. 1B1

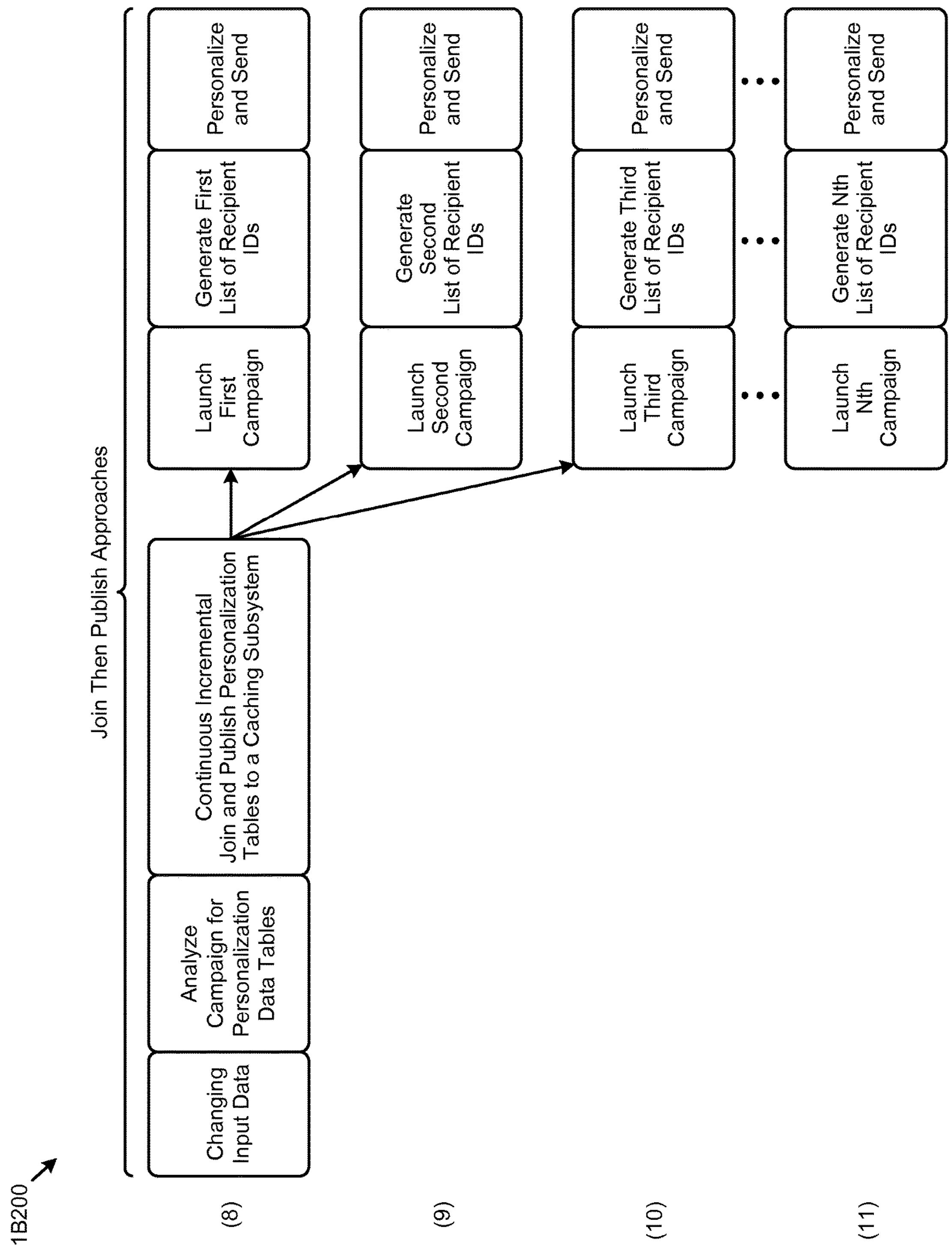
FIG. 1B2

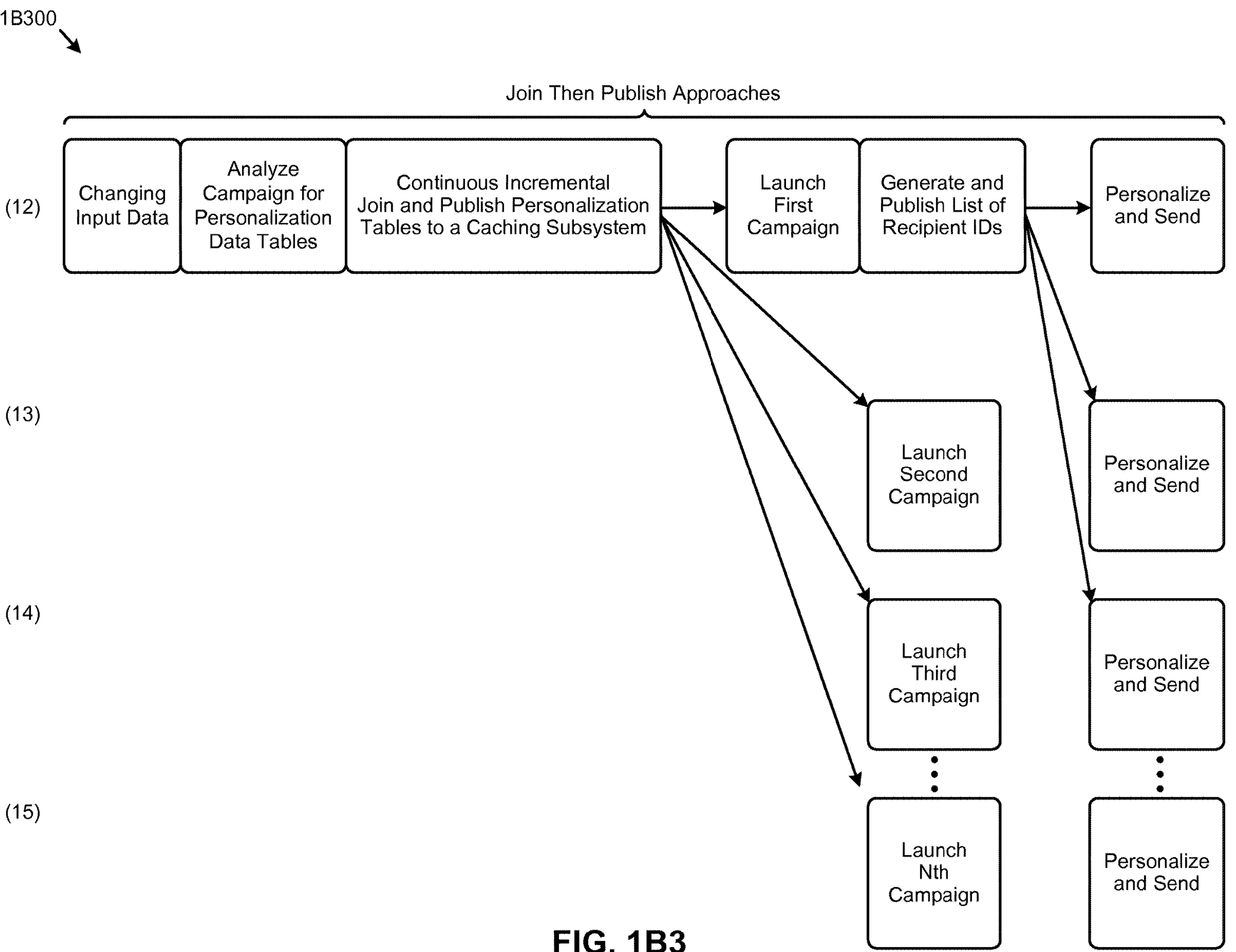
FIG. 1B3

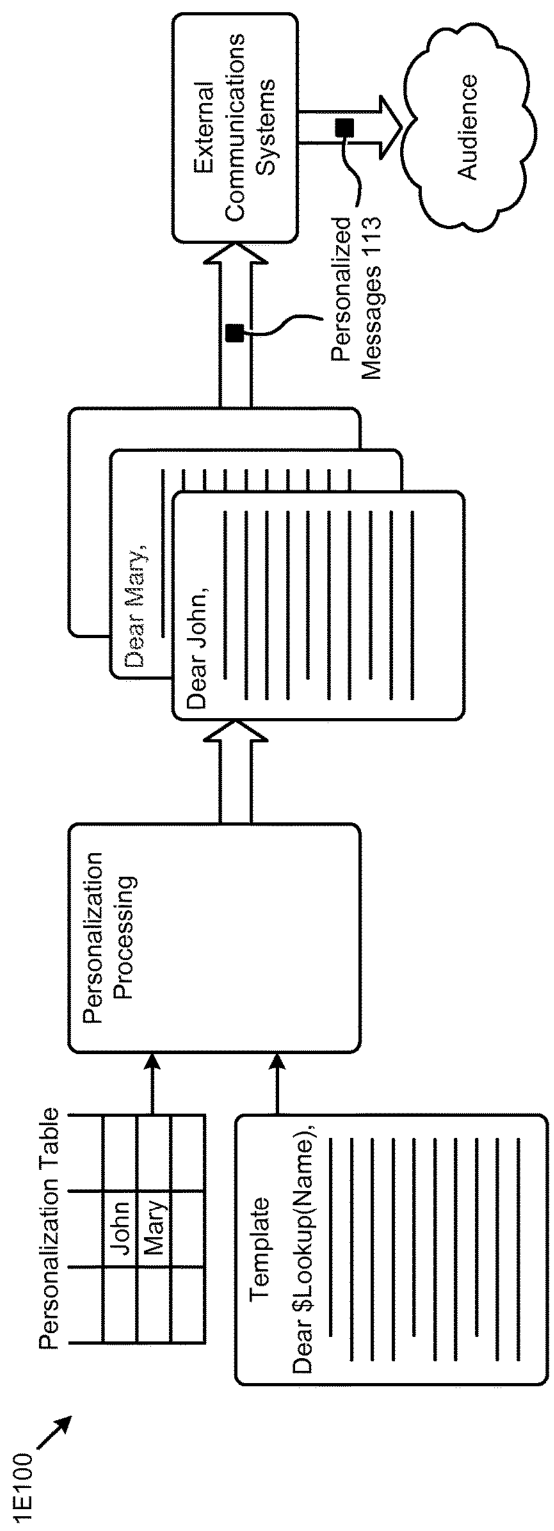
FIG. 1E1
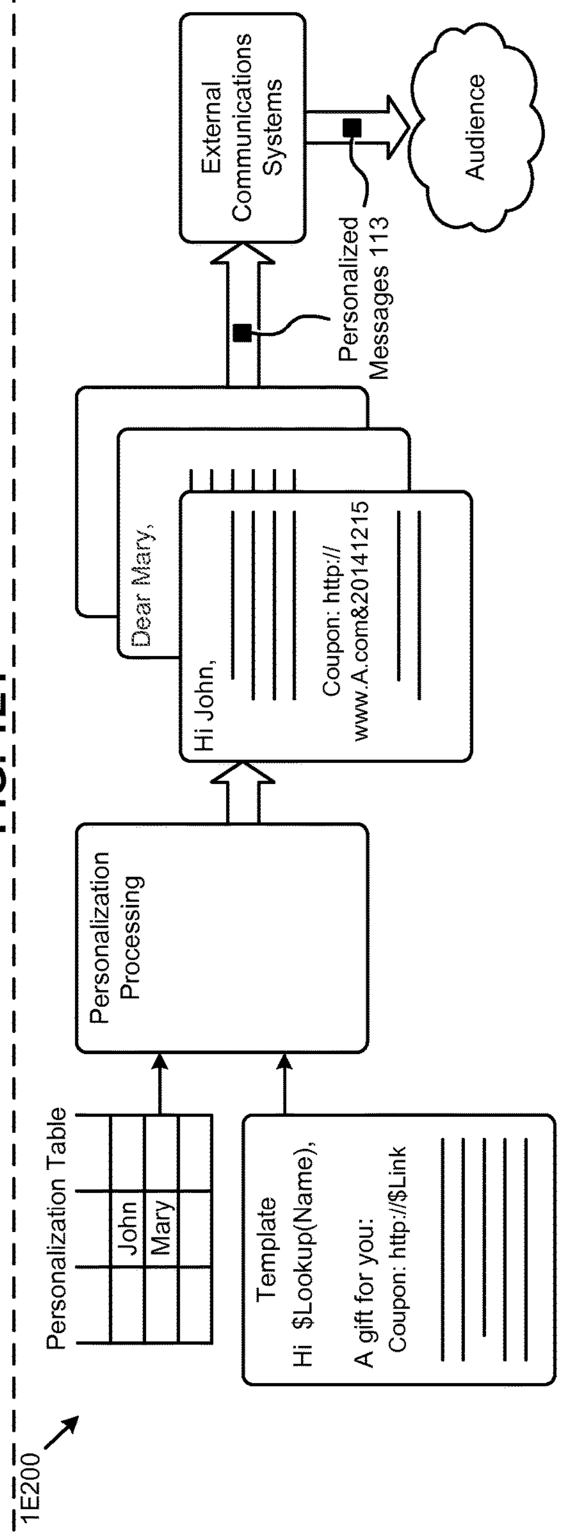
FIG. 1E2

MESSAGE PERSONALIZATION OVER MULTIPLE INTERNET MESSAGING CAMPAIGNS

RELATED APPLICATIONS

The present application claims the benefit of priority to U.S. Provisional Patent Application Ser. No. 62/026,483 titled, "SYSTEM, METHOD, AND ARCHITECTURE FOR USING TARGET LIST BUILD TO PERFORM MESSAGE PERSONALIZATION", filed Jul. 18, 2014, which is hereby incorporated by reference in its entirety; and the present application claims the benefit of priority to U.S. Provisional Patent Application Ser. No. 62/024,435 titled, "SYSTEM, METHOD, AND ARCHITECTURE FOR IMPLEMENTING MARKETING CAMPAIGNS WITH MESSAGE PERSONALIZATION" filed on Jul. 14, 2014, which is hereby incorporated by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

This disclosure relates to the field of Internet messaging campaigns, and more particularly to techniques for message personalization flows over multiple Internet messaging campaigns.

BACKGROUND

Marketers are always seeking better ways to create, execute, and automate campaigns with the goal of growing revenue and strengthening customer loyalty. A business process management (BPM) engine, or workflow engine, can be used to design and implement business execution actions such as, for example, business execution actions used in marketing campaigns, compensation calculation models, supply chain management, etc. In the marketing campaign example, a marketer can use the BPM engine to configure a series of connected workflow execution components that serve to prosecute aspects of a marketing campaign.

One workflow execution item in the example of Internet marketing campaigns is the generation of personalized messages to be sent to a set of target recipients. Such personalized message can take the form of a web page, an advertisement, an email communication, a text message, a mobile message, etc. In a conventional process for generating personalized messages, during a design phase, the marketer designs a template for personalized messages. The template includes stock message sections and personalization sections. The stock message sections contain marketing or other communication messages that are the same for all recipients of the personalized message. The personalization sections include commands defined by the marketer that invoke queries to the marketer's relational database management system (RDBMS) or any other database system, which stores the marketer's audience records and respective demographics of individual recipients in the list. During an execution phase, coordinated processes iterate through audience records in the database system and execute queries, the results of which are used to populate personalization sections of a template. The personalized messages are then sent out to the target recipients. A marketer then launches subsequent campaigns, possibly using a different message template, and/or a different set of queries. The aforementioned process may need to be repeated many times for many different marketing campaigns.

SUMMARY

Some embodiments of the present disclosure address the problem of how to perform message personalization over multiple Internet messaging campaigns (e.g., to different target recipients) without having to perform large join operations for each campaign and some embodiments are directed to approaches for performing a large join operation one time (e.g., with a full list of candidate target recipients) and publishing the join operation results to a write-once, read-many storage facility. More particularly, disclosed herein and in the accompanying figures are exemplary environments, systems, methods, and computer program products for asymmetric message personalization over multiple Internet messaging campaigns.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

The drawings described below are for illustration purposes only. The drawings are not intended to limit the scope of the present disclosure.

FIG. 1A1 depicts a flowchart of operations with corresponding mappings to a sequence chart and a relative timeline chart to illustrate use of asymmetric message personalization over multiple Internet messaging campaigns, according to an embodiment.

FIG. 1A2 depicts a series of data operation workflows performed over sample data to illustrate use of asymmetric message personalization over multiple Internet messaging campaigns, according to an embodiment.

FIG. 1B1 develops several flows of data operations that can be employed to achieve exploitation of asymmetric message personalization over multiple Internet messaging campaigns, according to some embodiments.

FIG. 1B2 and FIG. 1B3 depict several flows of data operations that are exploited when prosecuting multiple campaign launches that implement asymmetric message personalization over multiple Internet messaging campaigns, according to an embodiment.

FIG. 1E1 and FIG. 1E2 are schematic diagrams showing personalization flows in a marketing program that implements message personalization, according to some embodiments.

FIG. 2 is block diagram of a data delivery platform architecture used in systems for delivering multiple datasets while exploiting asymmetric message personalization over multiple Internet messaging campaigns, according to an embodiment.

FIG. 3 is a flowchart depicting an approach to processing multiple campaigns in parallel based on only one set of join operation results, according to some embodiments.

DETAILED DESCRIPTION

Figure 1C:
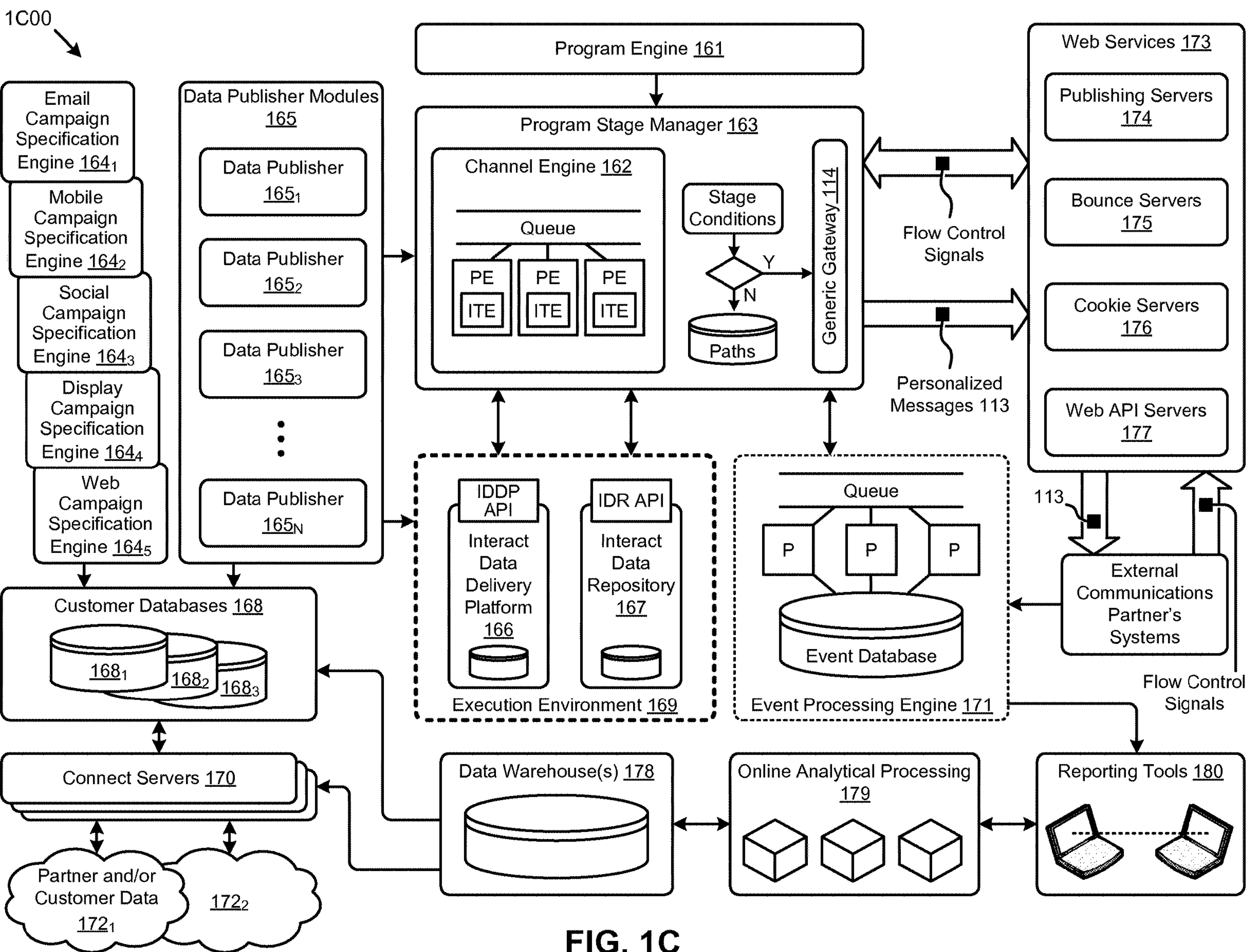
FIG. 1C is a block diagram marketing program system that implements asymmetric message personalization over multiple Internet messaging campaigns, according to an embodiment.

Some embodiments of the present disclosure address the problem of how to perform message personalization over multiple Internet messaging campaigns (e.g., to different target recipients) without having to perform large join operations for each campaign and some embodiments are directed to approaches for performing a large join operation one time (e.g., with a full list of candidate target recipients) and publishing the join operation results to a write-once, read-many storage facility. More particularly, disclosed herein and in the accompanying figures are exemplary environments, systems, methods, and computer program products for asymmetric message personalization over multiple Internet messaging campaigns.

Overview

The present disclosure provides systems, methods, and in computer program products for asymmetric message personalization over multiple Internet messaging campaigns. Certain embodiments are directed to technological solutions for performing a large (for example, joins over thousands, tens of thousands, or even millions of records), computationally intensive join operation one time (e.g., with a full list of candidate target recipients) and publishing the join operation results to a write-once, read-many storage facility, which embodiments advance the relevant technical fields, as well as advancing peripheral technical fields. The disclosed embodiments modify and improve over legacy approaches. In particular, the herein-disclosed techniques provide technical solutions that address the technical problems attendant to how to perform message personalization over multiple Internet messaging campaigns (e.g., to different target recipients) without having to perform the large computationally intensive join operations for each campaign. Such technical solutions may serve to reduce use of computer memory, reduce demand for computer processing power, and/or reduce communication overhead needed. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of high-performance computing as well as advances in the technical fields of distributed storage.

Steps are carried out in a computer system to generate personalized messages in a plurality of marketing campaigns using data stored in a relational database or any other database system. Some embodiments commence upon parsing a message template to identify commands to be executed, where the commands are used to look up data from a plurality of selected tables having at least one column comprising recipient IDs or other shared key(s). Two or more data sources are determined from the plurality of selected tables, where at least one of the data sources comprises one or more demographic attributes corresponding to at least some of the recipient IDs or other shared key(s). A join operation is performed over matching instances of the recipient IDs or other shared key(s) among the two or more data sources. The join operation results in a personalization table comprising rows having at least the instances of recipient ID or other shared key(s), a respective external address, and at least one of the demographic attributes. Further steps are taken to transform the personalization table into a key-value data structure and publish the key-value data structure to a caching subsystem. The caching subsystem is used to select a first set of recipients determined, and, without performing a second join operation (or otherwise re-performing the join operation), to select a second set of recipients. Personalized messages to at least some of the first and second set of recipients are formed using the message template and the key-value data structures.

In a naïve approach to execution of Internet marketing campaigns, an end-to-end campaign design and execution process is merely repeated start-to-finish for each campaign. However, such an approach fails to consider the asymmetric nature of many Internet campaigns, namely that some of the aforementioned processes need to be performed many times (e.g., once per each campaign), while some of the aforementioned processes need to be performed only once for a large number of campaigns. In exemplary cases, a join operation is performed during processing of audience records, and in some cases the latency of performing the join operation is often very unpredictable, making it impossible to provide service level agreement (SLA) guarantees throughput for message processing in the campaign.

Disclosed hereunder are systems that performs the aforementioned expensive join operations just once, and then published the results of the join to a specially-formatted data structure (e.g., a key-value data structure) in a specially-configured repository (e.g., in a specially-configured cache) for fast and repeated access to the results of the join operation.

The aforementioned join operations can be implemented as a join over database tables, and/or can be implemented using a process of analyzing the look up keys and then publishing tables individually so as to avoid actual joins from the cache servers. Name-value pairs from each table are published to the specially-configured cache.

Multiple campaigns can be run based on the published data. When such campaigns conform to certain sets of constraints, the performance levels defined in service level agreements can be guaranteed for the conforming campaigns.

Various embodiments are described herein with reference to the figures. It should be noted that the figures are not necessarily drawn to scale and that the elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, reference throughout this specification to "some embodiments" or "other embodiments" refers to a particular feature, structure, material, or characteristic described in connection with the embodiments as being included in at least one embodiment. Thus, the appearances of the phrase "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1A1 depicts a flowchart of operations with corresponding mappings 1A100 to a sequence chart and a relative timeline chart to illustrate use of asymmetric message personalization over multiple Internet messaging campaigns. As an option, one or more variations of mappings 1A100 or any aspect thereof may be implemented in the context of the architecture and functionality of the embodiments described herein. Also, the mappings 1A100 or any aspect thereof may be implemented in any environment.

The embodiment shown in FIG. 1A1 depicts a design phase, a targeting phase, and a personalization phase. During the design phase, a campaign is generated (see create campaign step 102). The campaign comprises aspects of a desired or targeted audience, and other parameters of a campaign such as a launch date and time and duration of the campaign. A generated campaign might also include budgetary constraints.

In a targeting phase, one or more workflows invoke several targeting phase steps. As shown, a launch step (e.g., see launch operation $\mathbf{104}_1$) collects data needed for running queries and/or filters (see filter operation $\mathbf{108}_1$) against a number of target recipients so as to identify a target audience, members of which audience that fall within certain "targeted" demographics. For example, a campaign might want to target only "males" in the age range "18 to 21 years of age". The targeted audience dataset (e.g., a relational database table) can be combined (e.g., see step 111) with other data in a join operation (see join operation $\mathbf{110}_1$) to generate combined data (e.g., joined data 101). A personalization phase is entered, and the combined data (e.g., joined data 101) is used to generate individual instances of personalized messages 113 (e.g., see personalize operation $\mathbf{112}_1$) which are then sent to recipients in the target audience (e.g., see send operation $\mathbf{114}_1$). The mechanism for delivery of such personalized messages can involve any Internet-based communication channel (e.g., email channels, SMS channels, etc.).

The operation sequence of the foregoing example is mapped to a sequence chart (e.g., see filter operation $\mathbf{108}_2$, join operation $\mathbf{110}_2$, personalize operation $\mathbf{112}_2$, and send operation $\mathbf{114}_2$). This sequence is merely one example, and other sequences are possible. In particular, some campaigns might specify the use of two or more communication channels (e.g., an email channels and an SMS channel) that are to be used in the prosecution of the campaign. In such a case, two personalization phases can run their respective courses so as to send personalized email messages in a first run of a personalization phase (see personalize operation $\mathbf{112}_3$ and send operation $\mathbf{114}_3$), followed by a second run of a personalization phase to send personalized SMS messages (see personalize operation $\mathbf{112}_4$ and send operation $\mathbf{114}_4$). As shown, the occurrence of join operation $\mathbf{110}_3$ is relatively longer than the occurrence of join operation $\mathbf{110}_2$. In practice, a join operation for an Internet campaign might consume a significant portion of the total end-to-end processing time (e.g., clock time) and also might consume a significant portion of the computing resources used.

In some embodiments a multi-processor system is used, and for large campaigns, a multi-tenant software as a service (SaaS) platform can be used to generate highly personalized messages (e.g., promotional and transactional messages). It is desirable to be able to provide contractually-binding service level agreements (SLAs) that define performance in terms of throughput achieved on behalf of the customer of the SaaS platform. For example, service guarantees (e.g., under an SLA) may need to be given to a "Flash Sale" customer who needs a guaranteed throughput (e.g., on the order of 1 million messages per minute). However, sending highly personalized messages at such scale to the targeted recipients in a multi-tenant platform is a very complex problem.

In order to meet the SLAs and any constituent service level objectives (SLOs), certain embodiments use an independent execution environment that is isolated from design functions and data management functions. The execution environment include an in-memory cache of the personalization data that is kept in sync with the master data that is located in the design environment. Personalization data sources are published to the execution environment at the beginning of, or prior to, a personalization phase. In this way, the system can avoid the expense and complexity of constructing the personalization data structures when time comes to actually launch the campaign, and the system can avoid the expense and complexity of reconstructing the personalization data structures when launching a second campaign that accesses the same personalization data.

In a relational database setting the approach of pre-calculating and prepositioning the join data eliminates the need to repeatedly perform complex joins of the personalization tables. During the personalization phase, the system can access (e.g., look-up, query) the prepositioned data in-memory cache. Such accesses made to prepositioned data that is cached in the execution environment are deterministic, and thus SLOs or other performance-oriented guarantees in an SLA can be achieved.

The foregoing depiction of the flow of data operations are abstracted so as to be illustrative. A small example of a campaign is given in the FIG. 1A2.

Figure 2:
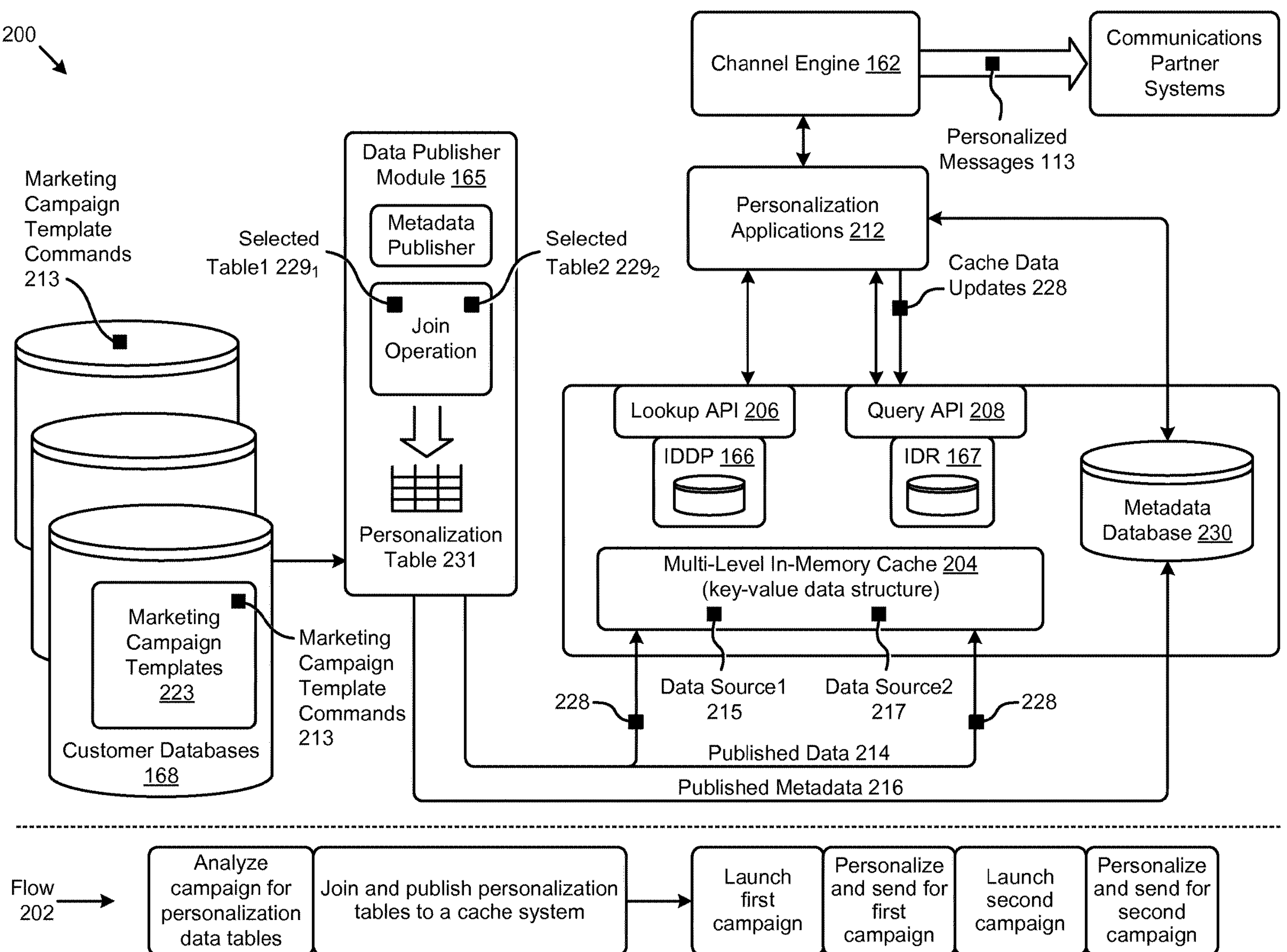

FIG. 1A2 depicts a series of data operation workflows 1A200 performed over sample data to illustrate use of asymmetric message personalization over multiple Internet messaging campaigns. As an option, one or more variations of data operation workflows 1A200 or any aspect thereof may be implemented in the context of the architecture and functionality of the embodiments described herein. Also, the data operation workflows 1A200 or any aspect thereof may be implemented in any environment.

The flow 1A210 shows a raw list having a sample set of demographic data (see the "Raw List Table"). The raw list data is filtered to select only recipients that meet targeting criteria (see "Filtered List"). The filtered list is joined with the "Personalization Table"), resulting in the shown "Joined Table". The flow 1A210 is merely one example flow that results in the desired set of target recipients.

A different flow, shown and flow 1A220, performs the join operation before filtering down to the desired set of target recipients. In this flow 1A220, the join operation is more expensive than the join operation of mappings 1A100 (e.g., since there are more entries in the resulting joined table). However the additional expense might return dividends when multiple campaigns are run off of the resulting joined table.

This situation can be further exploited, as shown in flow 1A230, where the resulting joined table is published to a cache. As shown, a filter operation to generate a recipient list can be performed after the resulting joined table is published to a cache (e.g., see sequential flow sequence 1A240), or a filter operation to generate a recipient list can be performed in parallel with publishing the resulting joined table cache (e.g., see parallel flow sequence 1A250).

Many other sequential and/or parallelized flows of data operations can be used in various situations. Some of the possible flows are discussed infra.

FIG. 1B1 develops several flows of data operations 1B100 that can be employed to achieve exploitation of asymmetric message personalization over multiple Internet messaging campaigns. As an option, one or more variations of data operations 1B100 or any aspect thereof may be implemented in the context of the architecture and functionality of the embodiments described herein. Also, the data operations 1B100 or any aspect thereof may be implemented in any environment.

One possible flow improvement is to perform the personalization operations and sending operations concurrently. This scenario is illustrated by comparing and contrasting the operations flow 1B100(1) with the operations flow 1B100 (2). In exemplary cases, as soon as a first campaign message has been personalized, it is ready to be sent. There is no data dependency for sending the first campaign message on any other campaign message, so the personalization and sending operations can be pipeline or otherwise organized to operate substantially asynchronously.

Some situations of processing multiple campaigns present a first campaign and a second campaign that are so different that there are few or no recipients in common (see operations flow 1B100(3). Such a situation can occur when two campaigns are run using two different languages (e.g., English and Japanese), and/or when the recipients are known to be domiciled in different countries. In such situations the flow for the first campaign and the flow for the second campaign might each include a respective join operation (as shown).

Yet, in many situations, multiple campaigns can be run, and each run can draw from prepositioned or published data (e.g., recipient data that has been formatted for storage into and access through a caching system). In such cases, the cost of producing a relatively larger joined table and the cost of formatting and prepositioning recipient data can be amortized over the running of multiple campaigns.

Exemplary join-then-publish approaches include the following:

- Operations flow 1B100(4) shows a processing flow when a change to the campaign message is implemented.
- Operations flow 1B 100(5) shows a processing flow when multiple changes to the campaign message are implemented.
- Operations flow 1B100(6) shows a processing flow when input data is changed and incremental changes to the join table are published prior to running the next campaign.
- Operations flow 1B100(7) shows an incremental join then publish processing flow depicting cases when input data is changed and then incremental changes are published asynchronously with running the next campaign(s). The incremental join and publish operation operates over changed portions of the input data, and the incremental join and publish operation operates runs concurrently with batch join operations (if any).

Using any of the aforementioned processing flows or variations therefrom, the inventive architecture can advantageously deliver expected SLOs in terms of, for example, throughput and latency. One particular situation corresponds to implementation of an in-memory cache that is kept in sync with master data (e.g., master data that is located in a non-cache storage environment such as in a relational database management system (RDBMS). Metadata is kept in the execution environment. Such metadata is held in association with respective subject data, and such metadata specifies how recent the cached data is compared to the time of a master clock (e.g., a clock in a master database). As the personalization data is looked up from the cache, the system maintains the cache with consistent and up-to-date data. Further details regarding maintaining a cache with consistent and up-to-date data are presented as shown and described as pertaining to FIG. 1D.

Figure 3:
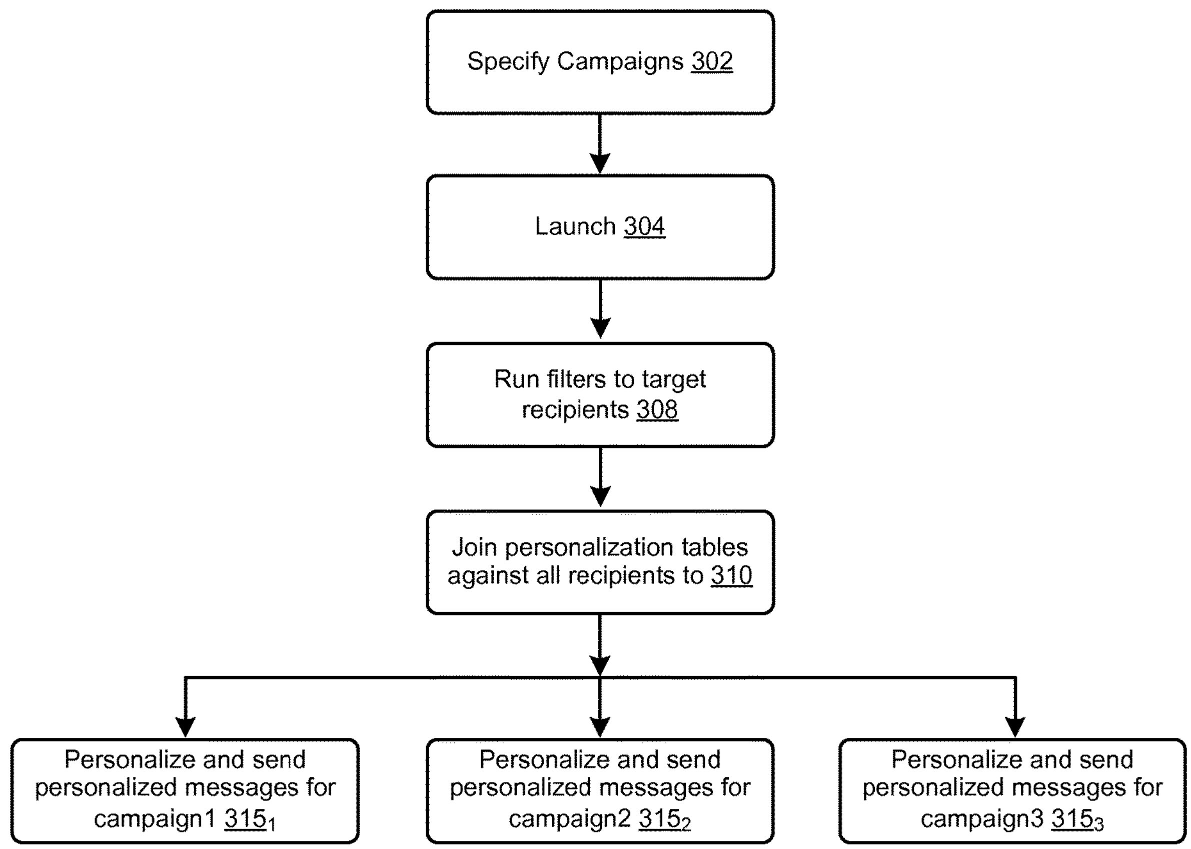

FIG. 1B2 and FIG. 1B3 depict several flows of data operations that are exploited when prosecuting multiple campaign launches that implement asymmetric message personalization over multiple Internet messaging campaigns. As an option, one or more variations of data operations or any aspect thereof may be implemented in the context of the architecture and functionality of the embodiments described herein. Also, the data operations or any aspect thereof may be implemented in any environment.

The flows of the join-then-publish approaches of FIG. 1B2 and FIG. 1B3 depict continuously changing input data that is analyzed and published to a caching subsystem before being used to launch a first campaign (see shown join-then-publish approach 1B200(8)). The same input data that is analyzed and published to a caching subsystem before being used to launch a first campaign is used to launch a second campaign (see shown join-then-publish approach 1B200 (9)), as well as a third campaign (see shown join-then-publish approach 1B200(10)), as well as an Nth campaign (see shown join-then-publish approach 1B200(11)). As depicted, any or all of the campaigns of FIG. 1B200 can be run concurrently. In particular, continuous incremental join and publish operations can update personalization tables in a caching subsystem.

One variation of the join-then-publish approach of FIG. 1B2 is presented in FIG. 1B3. The join-then-publish approaches includes a first campaign in which a set of recipient IDs are generated and published (see the shown join-then-publish approach 1B300(12)). The generated and published IDs are used in the personalization and send operation of the second campaign (see join-then-publish approach 1B300(13)), a third campaign (see join-then-publish approach 1B300(14)), and an Nth campaign (see join-then-publish approach 1B300(15)).

FIG. 1C is a block diagram of a marketing program system 1C00 that implements asymmetric message personalization over multiple Internet messaging campaigns. As an option, one or more variations of marketing program system 1C00 or any aspect thereof may be implemented in the context of the architecture and functionality of the embodiments described herein. Also, the marketing program system 1C00 or any aspect thereof may be implemented in any environment.

A logical deployment overview of some embodiments is illustrated in FIG. 1C. Some embodiments implement a cache using an advanced interact data delivery platform (IDDP), which includes a set of execution platforms to implement program and campaign execution to very effective levels of predictability, performance, availability, and scalability.

Campaign data from the customer is stored in customer databases 168. Customer databases include information about the campaign, information about the recipients, and data about the customer's products (e.g., in the form of message templates). Many tables of relational data may exist in the customer database. The IDDP publisher takes the customer data and publishes the data to the in-memory cache of the shown interact data delivery platform 166. A set of rules is implemented to define the workflows for extracting, transforming, and replicating the data to multiple target destinations. Data that is less frequently accessed, or is larger, can be stored in an interact data repository 167.

To launch a campaign, a fast lookup is performed for profile data for the recipients to perform the personalizations by various personalization application modules. The in-memory cache includes a key-value store to hold data for the fast lookup. The relational data in the customer database can be converted into a key-value store to enable the fast lookup.

A table of a relational database can be converted to a key-value data structure stored in memory (e.g., system memory of a cache server). The table includes a primary key K (e.g., customer ID) and a plurality of data fields F1-Fn (e.g., name, phone number, e-mail address, etc.). When the table is transformed to a key-value data structure, the total number of entries remains the same and the primary key is retained as the key of the key-value data structure. However, for each entry, the data in data fields F1-Fn are encoded as a single value and stored in the value field of the key-value data structure. In one embodiment, binary encoding is carried out to encode the data in data fields F1-Fn into a single value. In addition, the data may or may not be compressed during the binary encoding, and each binary encoded field is preceded by a 'field-type' byte identifying the field type such as UTF string, signed long, etc. The field-type byte identifies for non-string types, the number of following bytes that store the encoded field. For string types, the UTF representation of the string includes a size in the header that identifies the size of the string field.

Further details regarding general approaches to implementation of a key-value store to enable the fast lookup are described in U.S. Pat. No. 8,775,448, issued on Jul. 8, 2014, which is hereby incorporated by reference in its entirety.

Under certain circumstances, it may also be desirable to perform a search or query without using the key-value store, (e.g., using a SQL query against relational data). Therefore, two types of APIs (e.g., IDDP API and IDR API) may be exposed—one to perform key lookups and the other to perform a field lookup. Metadata is maintained in the metadata database to describe the data in the in-memory cache, e.g., to describe the schema of the key-value store.

Updates may occur to the customer data, e.g., where the recipient takes some action (for example, though a web form). The updates can be queued to make the updates to the customer database (system of records or SOR). The updates can also be made to the in-memory cache (e.g., see the join-then-publish approach 1B300(12)).

The data delivery platform is capable of implementing any of the following concepts and philosophies:

- Isolation. Campaign execution is isolated from design and data management activities. When execution is isolated from design and data management activities, this allows execution not to be impacted by design-time metadata and content changes, and by design and data management workload.
- Latency Predictability. Random read data access with low latency (e.g., predictably less than 5 milliseconds) can serve personalized web pages predictably (e.g., in less than 100 milliseconds).
- Sustained high throughput. Read data access supports a sustained bulk launch to permit, for example, throughput of 20,000 personalized messages per second.
- High-availability and continuous availability without downtime. The platform is available without downtime to respond to web requests and real-time messaging requests.
- Scalability. Cost-efficient linear scalability is achieved by horizontally scaling across commodity hardware with low cost software.

Some embodiments comprise campaigns that are run in a dedicated high performance and high availability execution environment isolated from impact by design and data management activities such as Connect jobs and complex filter queries, and isolated from downtime of the design and data management environment. This means that campaigns can depend only on execution environment resources. In this approach, there is no dependency on customer databases and shared SAN storage.

Figure 5:
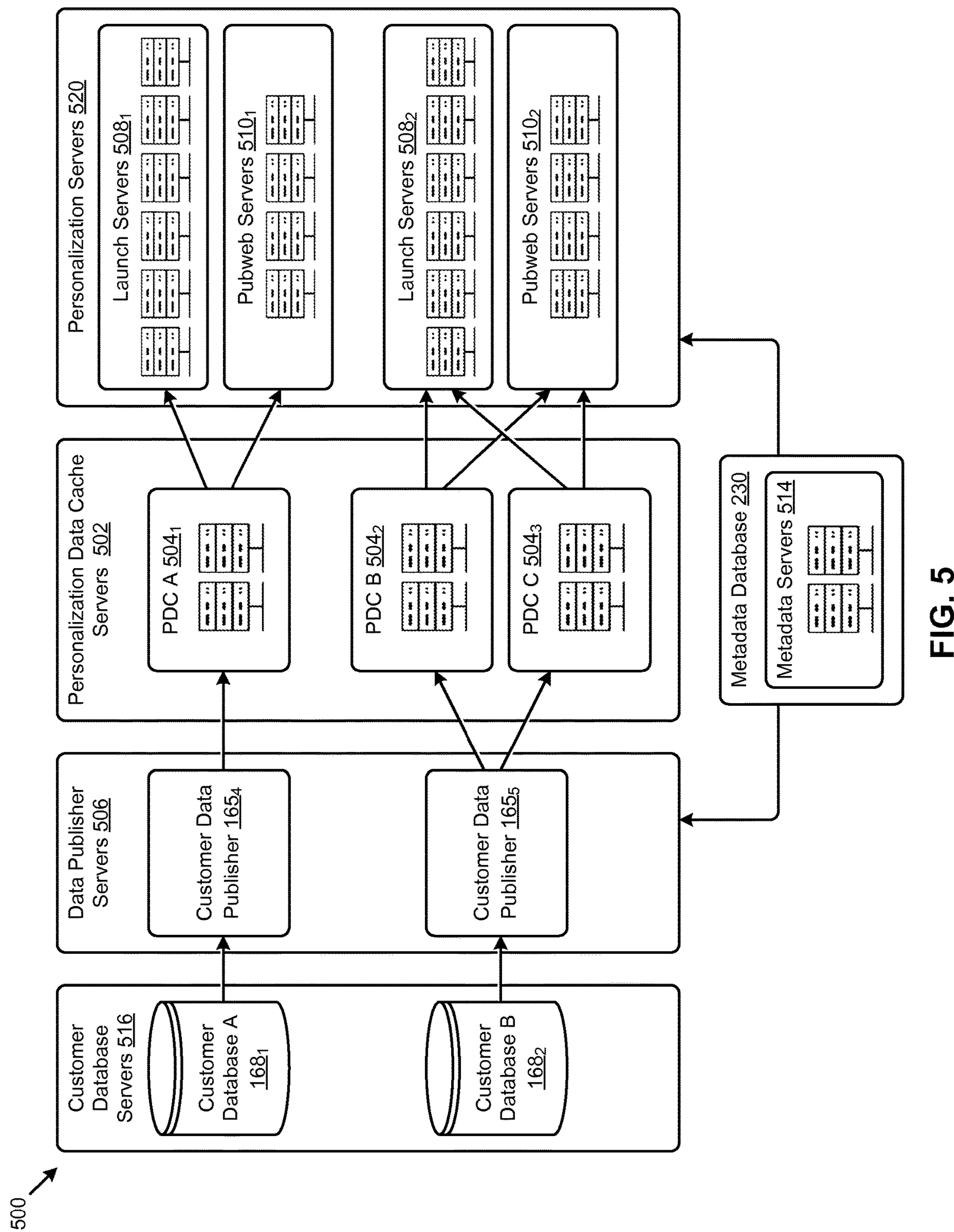
FIG. 5 depicts a server mapping used to exploit parallelism when performing asymmetric message personalization over multiple Internet messaging campaigns, according to an embodiment.

In some embodiments, the execution environment 169 includes an in-memory cache (e.g., see interact data delivery platform 166) implemented on shared cache servers (e.g., see FIG. 5). Once formatted (e.g., with compression), the working set of personalization data of accounts of a customer database can be held in-memory. In some deployments, each cache server has a dedicated hot standby that applications can transparently failover to for uninterrupted service. Some embodiments employ active-active clusters of cache servers (e.g., where multiple servers in the active-active cluster are live). For catastrophic failure of both the primary and standby cache servers, applications failover to the system-of-record customer databases.

The design phase of the flows comprise any number of entities that designs marketing campaigns (e.g., to be executed in a software as a service (SaaS) architecture). Continuing the discussion of this FIG. 1C, one or more campaign specification engines are used to design the marketing campaigns. The outputs of these campaign specification engines can be used to drive channel-specific applications to carry out channel-specific campaigns (e.g., email campaigns, mobile campaigns etc.) that are facilitated by configurations that are tailored for specific channels/mediums. Such channels/mediums include, for example, email, SMS or other mobile applications, social media, web outlets, and various types of displays. A marketing person can use the application to design the content to appear in the email campaign (e.g., text, images, video, etc.), which can then be stored into customer databases. In one embodiment, the application is provided to allow the user to visually design, manage, and automate a multistage lifecycle program through a drag-and-drop user interface and a library of pre-built program templates.

Further details regarding general approaches to implementation of a drag-and-drop user interface and a library of pre-built program templates are described in U.S. Provisional Application Ser. No. 62/026,470 titled "SYSTEM AND METHOD FOR IMPLEMENTING PROGRAM STAGE GATES IN A BUSINESS PROCESS WORKFLOW" filed on Jul. 18, 2014, which is hereby incorporated by reference in its entirety.

The designer of the campaign may also design a business workflow for the campaign. A business process management engine or workflow engine (shown in the figure as the program stage manager 163) can be used to implement the business execution actions or workflows for the campaign. The program engine comprises any entity or application that describes the various decision points and/or paths to implement and define the business workflow for the campaigns, which may be implemented as a multistage marketing campaign. The campaign marketer may also provide data pertaining to the individuals to whom a marketing campaign is directed. This may include, for example, lists of customers/targets or other forms of recipients, as well as instructions to identify the subsets of the customer lists that should be the targets of the campaign. For example, one common business process to be implemented by the campaigns involves personalized messages, which may be sent as a personalized web page, a personalized advertisement, a personalized email communication, a personalized text message, or a personalized mobile message, etc.

Data publisher modules publish data to the execution environment 169. The execution environment comprises one or more servers that perform the business processing for the marketing campaigns. In a SaaS architecture, these servers may be used to service marketing campaigns for multiple customers.

In some embodiments, different types of engines (e.g., channel engine 162) may be provided to handle the different channels/types of marketing campaigns to be executed. For example, for an email campaign, an email channel engine might be used, and a channel engine can includes a program stage manager to manage the email channel execution through the marketing campaign. This queue manager (e.g., a process or thread) manages the work placed into a queue for processing by various personalization engines (PEs). An interactive template engine (ITE) can be employed by the personalization engine to perform the message personalization. The personalized messages 113 are then sent to an email gateway to be processed for transmission to the campaign targets. A similar engine is provided for other channels such as the mobile, social, display, and web channels. This architecture is particularly efficient and scalable to handle large numbers of messages to be personalized.

In some embodiments, a common gateway is provided to handle personalized messages for multiple ones of the channels, rather than providing an individual gateway for each channel engine. In this approach, the common gateway comprises an extensible framework that permits messages to be provided to different channel destinations (e.g., using customization scripting such as Javascript). This permits channel gateways to be implemented far more quickly since an entirely new channel engine architecture does not need to be custom designed for the new channel. Instead, a generic channel engine can be implemented for messages to the common gateway, which are then provided in a customizable manner to the custom channel.

Further details regarding general approaches to implementation of a common gateway are described in U.S. patent application Ser. No. 14/798,268, titled "COMMUNICATION GATEWAY SERVICES IN A NETWORKED MESSAGE DISTRIBUTION SYSTEM" filed on even date herewith, which is hereby incorporated by reference in its entirety.

The program stage manager 163 executes a business process workflow for any number of work items. Each workflow may have a number of different stages. In one embodiment, a stage is an abstract class that represents a component within the business process workflow. Examples of stages include an email campaign stage, a short message service (SMS) campaign stage, an elapsed timer stage, a gateway (or "switch") stage, or any other technically feasible type of stage. In some embodiments, different business logic may be associated with each of the different types of stages.

An event manager mechanism is employed to manage events in the system. For example, once the messages are sent, an "event" is generated that is managed by the event manager. After the messages are sent, interactions may occur from various sources. For example, interactions may occur with the web world, where the user receives the message and takes some sort of action (e.g., causing an event from publishing servers, web API servers, bounce servers, or cookie servers). For instance, when a target receives an email from the campaign, that target may open up the email and then reply to a message, open a website, etc., which then causes the web services to take an action to generate a new trackable event in the system. The event manager therefore acts as a "listener" for the new events. A queue is maintained of the events in the system, with an event database to hold data pertaining to the events. One or more processing nodes/engines may be used to handle the events in the system.

The events may result in reporting of the event data (e.g., using reporting tools 180) to online analytical processing (OLAP) systems. In addition, the event data can be stored in one or more data warehouses. From the data warehouse, data can be sent back to the customer database (e.g., to update the customer data for use in future campaigns). A server—referred to herein as a "connect server"—can be used to pass data to/from the customer database. In some embodiments, the connect server performs extract, transform and load (ETL) processes to send data to/from the customer database. Data can also be sent to/from partner databases.

Some embodiments are implemented using an IDDP, which includes a set of execution platforms to implement program and campaign execution to very effective levels of predictability, performance, availability, and scalability.

Further details of an example architecture for generating personalization messages are provided in U.S. patent application Ser. No. 14/798,293, entitled AGE-BASED POLICIES FOR DETERMINING DATABASE CACHE HITS, filed on even date herewith, which is hereby incorporated by reference in its entirety.

As shown, one or more campaign specification engines (e.g., email campaign specification engine 164$_1$, mobile campaign specification engine 164$_2$, social campaign specification engine 164$_3$, display campaign specification engine 164$_4$, web campaign specification engine 164$_5$, etc.) are used to design and track the marketing campaigns. These campaign specification engines can be implemented, for example, as design applications running on computing systems that are configurable to support the design of campaigns tailored for specific channels and/or specific mediums. Such channels and/or mediums include, for example, email, mobile applications, social media, web outlets, and various types of displays. A marketing person or campaign designer can use the design application to design the content to appear in the email campaign (e.g., text, images, video, etc.), which can then be stored into one or more databases (e.g., customer database 168$_1$, customer database 168$_2$, customer database 168$_3$, etc.). In one embodiment, the design specification applications are provided to allow the user to visually design, manage, and automate a multistage marketing program. In some cases, design applications implement drag-and-drop user interfaces. In another embodiment, the design specification applications are provided to allow the user to visually design, manage, and automate a multistage marketing programs that employ multiple channels (e.g., an email channel, and an SMS channel). A library of prebuilt program templates can be provided in one or more databases.

In addition to design of content, a campaign designer may design a business workflow for a respective campaign. A business process management engine or workflow engine (e.g., program engine 161) can be used to implement the business execution actions or workflows for the campaign. The program engine comprises any entity or application that describes/designs the various decision points to implement and define the business workflow for the campaign that may be implemented as a multistage marketing campaign. The campaign marketer may further provide target lists and/or other data pertaining to the individuals to whom a marketing campaign is targeted. The aforementioned target lists and/or other data may include, for example, lists of customers as well as instructions to identify the subsets of the customer lists that should be the targets of personalized messages during the course of prosecution of the campaign. The customer databases 168 may therefore include relational data pertaining to customers.

Additional components of the marketing program system are configurable to publish campaign data to various components of the system. For example, data publisher modules 165 (e.g., data publisher 165$_1$, data publisher 165$_2$, data publisher 165$_3$, . . . data publisher 165$_N$) serve to publish data from the customer database to storage structures that hold the campaign and personalization data for access by the execution environment. A data delivery platform is provided to hold the campaign and personalization data. Such campaign and personalization data can be managed by the shown interact data delivery platform 166. Also, campaign and personalization data can be stored in one or more data caches, and such data caches can access one or more data repositories such as the shown interact data repository 167.

The marketing program system 1C00 comprises one or more servers that perform business processing pertaining to the marketing campaigns. In this SaaS architecture any of the shown servers may be used to service marketing campaigns for one or more customers. In some embodiments, the execution environment comprises an independent execution environment that is isolated from design and data management. The independent execution environment uses an in-memory cache of the personalization data that is kept in sync with the master data that is located in the design environment. As the cache data is synchronized, the metadata is kept in the execution environment that specifies how "fresh" or recent the cached data is compared to a time stamp or version stamp in a master database such as in the interact data repository 167.

In exemplary embodiments, a generic gateway 114 may be provided to handle personalized messages pertaining to marketing campaigns. For example, one or more instances of a program stage manager 163 can be employed. A channel engine 162 might include a program stage manager to direct the flow of messages when prosecuting a marketing campaign. The channel engine entity (e.g., a process or thread) manages the work placed into a queue for processing by various personalization engines (PEs), possibly in conjunction with web services 173. An interactive template engine (ITE) can be employed by the personalization engine to perform the message personalization. The personalized messages are then sent to a gateway (e.g., the generic gateway 114, as shown) to be processed for transmission to the campaign targets.

In some embodiments, different types of engines may be provided to handle the different channels/types of marketing campaigns to be executed. For example, for an email campaign, one or more email channel engines can be employed. An email channel engine might include a program stage manager to manage the specifics of handling personalized emails. For example, personalized emails can be sent to a generic gateway that has been configured as an email gateway to be processed for transmission to the campaign targets.

Further details regarding general approaches to interfacing through a generic gateway to a short message service provider are described in U.S. application Ser. No. 14/564,658, titled "COMMON AGGREGATOR FRAMEWORK FOR SMS AGGREGATORS" filed on Dec. 9, 2014, which is hereby incorporated by reference in its entirety.

The program engine executes a business process workflow for any number of work items. Each workflow may have a number of different stages. In one embodiment, a stage is implemented as an abstract class that represents a component within the business process workflow. Examples of stages include an email campaign stage, a short message service (SMS) campaign stage, an elapsed timer campaign stage, a gateway (or "switch") campaign stage, or any other campaign stage. In some embodiments, different business logic may be associated with each of the different types of workflows or stages.

In some embodiments, a stage may include multiple "states" within the stage, and the multiple states can be described by a state transition diagram. A group of work items can be input into a given the stage. For example, a stage can include a ready state, a pending state, an executing state, a blocked state, a timer waiting state, and a disposable state. At the ready state, the group of work items is ready for execution of the stage. When a group of work items is initially created and the stage is the first stage of the business process workflow, the group is in a ready state. When an entire group of work items moves from a previous stage to a current stage together, the group is in a ready state. At the pending state, the stage is buffering membership and is not ready for execution. Once the previous stage has completed executing, the state of the group transitions to the ready state. At the executing state, the stage is executing on the group of work items. At the blocked state, the group of work items has failed execution, e.g., an error has occurred. After the executing state is complete, if additional stages exist in the business process workflow, then the group state transitions to the "ready state" for the next stage of the business process workflow. If no additional stages exist, then the group state transitions to the disposable state. A group of work items becomes disposable when the stage is the last stage of the business process workflow or when there are no subsequent stages. A "garbage collection" process can be scheduled to perform garbage collection at a low load time and can delete the group membership and group for this stage. The timer waiting state is associated with a stage that is an "elapsed time" stage having a future expiration date.

Further details regarding an approach to implement business workflows are described in U.S. application Ser. No. 12/985,269, filed on Jan. 5, 2011, which is hereby incorporated by reference in its entirety.

An event manager mechanism (e.g., event processing engine 171) is employed to manage events in the system. For example, once the messages are sent by a gateway, an "event" is generated that is managed by the event processing engine. After the messages are sent, interactions may occur from various sources. For example, interactions may occur within the online world such as when a receiver of an email message takes some sort of action, which action causes a next event. Such actions and/or events that are caused by the actions can be processed by various web services. Such web services can comprise, but are not limited to, publishing servers 174, and/or bounce servers 175, and/or cookie servers 176, and/or web API servers 177. Strictly as an example, when a targeted recipient receives an email from the campaign, that targeted recipient may open the email and then take an action such as (1) reply to the message, (2) navigate to a website, (3) fill out a form, etc., any of which actions then cause a corresponding component from among the web services to generate a new event and to communicate aspects of that event to the event processing engine 171 in the system. The event manager therefore acts as a "listener" for the new events. A queue is maintained of the events in the system, with an event database to hold data pertaining to the events. One or more processing engines may be used to handle the events in the system.

The events may result in reporting of the event data such as through use of reporting tools and/or through use of online analytical processing 179 (OLAP) systems. In addition, the event data can be stored into one or more data warehouses 178. From the data warehouses, data can be sent back to the customer database (e.g., so as to update the customer data for use in future campaigns). Servers such as the shown connect servers 170 can be used to pass data to and from the customer database. In some embodiments, the connect server receives data from partner and/or customer clouds (e.g., cloud $\mathbf{172}_1$, cloud $\mathbf{172}_2$, etc.) and performs extract, transform and load processing (ETL processing) before sending data to the customer database. Data can also be sent to/from partners' and customers' databases using any known-in-the-art technology.

Further details of an example architecture for generating personalization messages are provided in U.S. patent application Ser. No. 14/798,293, entitled AGE-BASED POLICIES FOR DETERMINING DATABASE CACHE HITS, filed on even date herewith, which is hereby incorporated by reference in its entirety.

Returning to the discussion of the event processing engine 171, the time between any of the aforementioned events can be fractions of a second, or can be days, weeks or months. In particular, campaign specifications may come in individual time-separated instances or in a pattern spanning many weeks or months. The data in the IDDP might become quickly out of date for some situations, or it might remain valid for a long time in other situations. Techniques to manage such data-update events and techniques for performing time-wise validation of cached data is discussed hereunder.

Figure 1D:
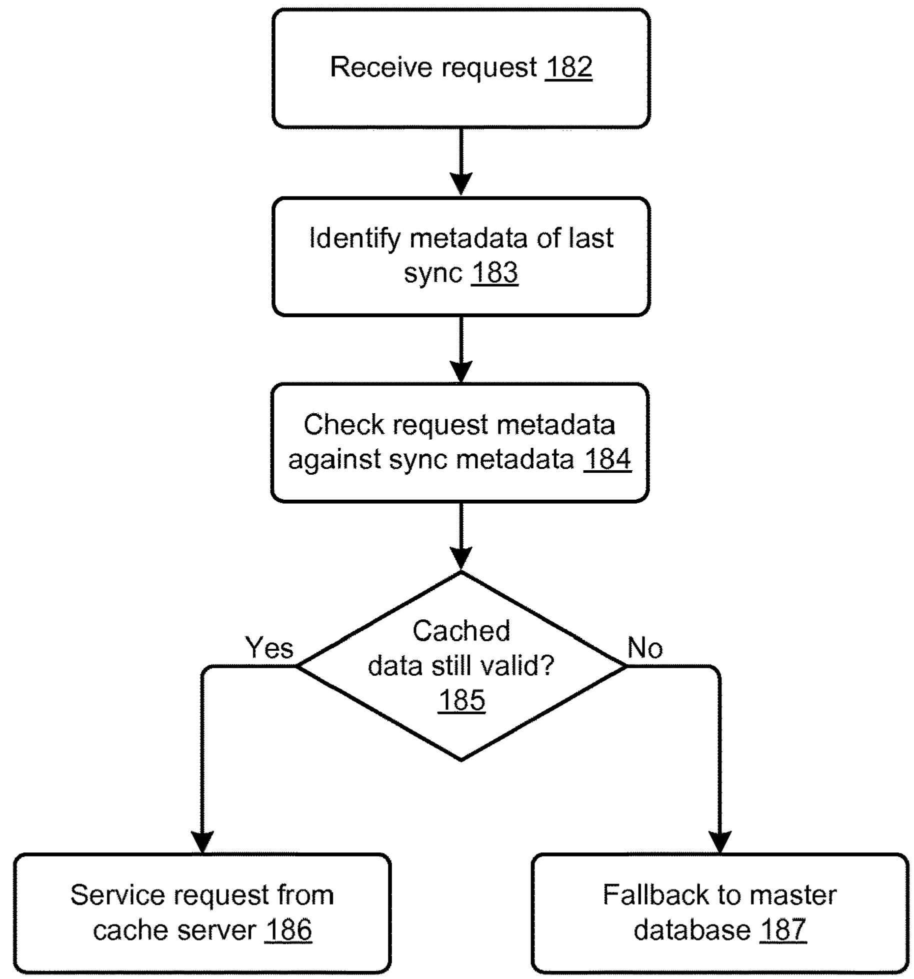
FIG. 1D is a flowchart showing an approach to perform time-wise validation of cached data as used in systems for asymmetric message personalization over multiple Internet messaging campaigns, according to an embodiment.

FIG. 1D is a flowchart showing an approach 1D00 to perform time-wise validation of cached data as used in systems for asymmetric message personalization over multiple Internet messaging campaigns. As an option, one or more variations of approach 1D00 or any aspect thereof may be implemented in the context of the architecture and functionality of the embodiments described herein. Also, the approach 1D00 or any aspect thereof may be implemented in any environment.

The flow of FIG. 1D commences by receiving a lookup request for data in the cache server (see step 182). The metadata for the cached data is checked to determine the timestamp of the last sync of that data and/or whether that data is up-to-date (see step 183). The metadata for the cached data is then checked against the lookup request (see step 184). The metadata for the lookup request can be any data that provides information about the level of sync required for the cached data, e.g., by using a parameter that establishes an as-of-time value. This parameter can be established, for example, by receiving the as-of-time value from the customer.

Next, the lookup request is evaluated against the metadata for the cached data to see if the cached data is valid enough for the request (see decision 185). If so, then the request is serviced from the cache server (see step 186). If not, then the process falls back to the master database (see step 187).

This process can be performed for any purpose to ensure that data that is deemed to be out-of-date does not get used to personalize messages. For example, this verification can be performed to make sure that expired marketing offers are not provided to recipients. Following are some example scenarios involving a check of the validity of the cached data.

Implementation 1: Marketers can use the system is to upload personalization data into the master database, and then perform a bulk launch for targeted recipients. In this case, the launch start time is used for the parameter (e.g., an "AsOfTime" parameter) when determining the data recency for doing cache lookups. For example, it is conceivable that the data in the master can be modified right after the launch start time, and it may not be able to sync the cache data with these changes. But when the personalization data is looked up during the launch, as long as the data that is in cache is recent as of the launch start time, the cached data can be used. Otherwise, the lookups fallback to the master database.

Implementation 2: The message sent as part of the bulk launch may contain links to web pages. When the end user clicks the link, the web page is served with the recipient personalization data. In exemplary embodiments, the link stores the parameter (e.g., an "AsOfTime" parameter) that corresponds to the start time of the bulk launch. As such, when the web page is personalized, the cache serves the lookup requests only if the cache data is up-to-date as of the requested time.

Implementation 3: A marketers wants to preview the message before initiating a launch that could be targeted to multiple recipients (e.g., millions of recipients). In the case involving such a preview, one may not wish to use the cached data. In this situation, an "AsOfTime" parameter will be set to the LATEST, and then lookups would fall back to the master database.

Implementation 4: A personalized message is sent to a single recipient that is the result of a web form submission. In this case, a user may input some data, and when the user submits the data, it may result in a personalization message being sent to that user. The message could have, for example, links to web pages. There are multiple possible use cases here. When the message it is personalized, there may be a need to use the "LATEST" for "AsOfTime", because one may not expect the cache to be synchronized in real time. However, the links could also use the "AsOfTime" that corresponds to when the message is generated. There is typically enough delay between the time the message is generated, and the time the user clicks the link in the message, and as long as the data in cache is recent as of the time the message is generated, web page personalization that happens when the user clicks the link will use the cached data.

Implementation 5: There are cases where a marketer may not care about consistency of data. In such case, the "AsOfTime" can be null and, if so, as long as the data is in the cache, lookups will happen from the cache irrespective of the data recency.

Implementation 6: There are some cases where multiple concurrent campaigns run against the personalization data that produce different results. For example, if it is possible that a first campaign is launched with the appropriate metadata to use the cached personalization data, but a subsequent campaign is launched and executed at the same time that uses an AsOfTime" parameter that is set to the LATEST. This may occur, for example, if the second campaign needs a more recent set of personalization data than the first campaign.

As noted above, after the personalization data in the customer database is published to the execution environment, that data might still need to be synchronized to make sure that it is up-to-date with the data in the master database.

FIG. 1E1 is a schematic diagram 1E100 showing email message personalization in a marketing program. The personalization processing takes in a personalization table and a template. The template shown has a personalization command (e.g., see the personalization command identified as $Lookup(Name)) to be performed by the system. The name lookup command is executed and the value of Name is assigned by the personalization processing. The personalization processing outputs personalized messages 113 with the variables assigned. In some cases a template comprises multiple commands and multiple variables. In some cases the personalization table comprises millions or even hundreds of millions of rows. The aforementioned commands and variables can take on a variety of forms. In some scenarios the variable assigned is itself a variable to be resolved at a later moment in time. FIG. 1E2 presents one such scenario.

FIG. 1E2 is a schematic diagram 1E200 showing web page personalization in a marketing program. The personalized messages are sent as part of bulk email campaign, and the body of the email may contain embedded links to web pages. After sending the message, and after the recipient receives the email message and clicks the link, the web page is served with the recipient personalization data. In exemplary embodiments, the link stores the parameter (e.g., an "AsOfTime" parameter in the form of a date) that corresponds to the start time of the bulk email campaign launch. When the web page is personalized, the cache serves the personalized web page only if the cache data is up-to-date as of the requested time. As shown, the link comprises an AsOfTime parameter in the URL. In this example, the "AsOf" date is encoded as "YYYYMMDD" or (as shown) "20141225" which is the YYYYMMDD-style encoded value corresponding to Dec. 25, 2014).

FIG. 2 is block diagram of a data delivery platform architecture 200 used in systems for delivering multiple datasets while exploiting asymmetric message personalization over multiple Internet messaging campaigns. As an option, one or more variations of data delivery platform architecture 200 or any aspect thereof may be implemented in the context of the architecture and functionality of the embodiments described herein. Also, the data delivery platform architecture 200 or any aspect thereof may be implemented in any environment.

Aspects of the data delivery platform architecture 200 are hereinabove disclosed as pertains to the execution environment 169. The data delivery platform architecture 200 is tuned to deliver very high levels of predictability, performance, availability, and scalability. The architecture includes one or more instances of an interact data delivery platform 166 (IDDP), one or more instances of an interact data repository 167 (IDR), a metadata database 230, and a multi-level in-memory cache 204. The IDDP and IDR can be accessed and/or controlled through APIs. As shown, a lookup API 206 provides an interface to/from the IDDP, and a query API 208 provides an interface to the IDR and/or to a query engine. API calls to/from the IDDP or IDR can carry data objects or pointers to data objects. Strictly as one example, the lookup API 206 can receive objects comprising any number of instances of cache data updates 228. More particularly, operation of personalization applications 212 may receive data from customer databases 168, and may process such data from customer databases using data delivery platform components. During the course of personalization, the personalization applications may store and/or access data that is held in the multi-level in-memory cache 204. Data can also be stored and/or accessed by various data publishers. For example, and as shown, data publisher module 165 can deliver published data 214 to the multi-level in-memory cache 204, and the data publishers modules can deliver published metadata 216 to the metadata database 230.

FIG. 2 (bottom) presents flow 202 as a sequence of steps in the context of a marketing campaign. After analysis of a campaign, a data publisher module can be used to join and publish personalization tables and sync the contents of the personalization tables with the contents in a cache server. The data publisher module comprises extractors and distributors that allow for customer data, including data from the customer database as well as a metadata database, to be published to the cache server. Thereafter a first campaign can be launched and personalized messages sent, and a second campaign can be launched and personalized messages sent. The second campaign can commence without again performing the join operations.

The data delivery platform can include any number of cache servers, and such cache servers can be composed of servers built using commodity-hardware (e.g., Linux servers). The shown multi-level in-memory cache 204 can be a single memory cache, or can be distributed among a group of cache servers. The multi-level in-memory cache 204 can be populated with any partitioning of personalization data including personalization data pertaining to different campaigns. Such an architecture supports scalability to maintain a high number of concurrent lookups at high throughput with a predictable low millisecond response time, even as the number of concurrently in-process campaigns increases. This architecture supports a high volume of data inserts and updates from data publishers, as well as a volume of updates from applications. The approach can be scaled by adding cache servers as the number of concurrently in-process campaigns increases. In some implementations, each cache server has a respective hot standby server to facilitate system-wide high availability. Caches are persisted on local high-speed storage for fast startup after downtime and failure.

The shown metadata database comprises a highly-available transactional database of metadata to support atomicity, consistency, isolation, and durability (ACID). The metadata database stores campaign metadata published from customer databases, and can store live links as may be generated during prosecution of a marketing campaign. In some environments, the metadata dataset is small and can be contained in semiconductor memory for fast access.

As earlier indicated, the data publisher modules 165 publish content data and metadata to the data delivery platform. The data publishers can interface to customer databases and can be implemented as a Java application that publishes campaign personalization data pertaining to campaigns by retrieving data from customer databases and formatting (e.g., formatting into one or more tables) for delivery to the interact data delivery platform 166. In certain embodiments (e.g., such as in high availability installations), tables are published to both multiple cache servers (e.g., a pair of high-availability servers) in parallel. In some cases, publishing a table involves creating a corresponding optimized cache table, initially populating the cache table from the source table, continuously propagating source table changes to the cache table, and un-publishing the cache table when the table is no longer referenced by components involved in any in-progress campaign.

A metadata publisher propagates published campaign metadata to the metadata database and deletes or disables published metadata from the metadata database when a campaign is unpublished. A reverse replication process propagates live links from the metadata database to customer databases. A content publisher propagates published campaign content to the execution content store and purges published content not referenced by published campaigns. The customer databases can be populated from partner and/or customer data (e.g., from cloud $\mathbf{172}_1$ and/or from cloud $\mathbf{172}_2$). In some cases partner and/or customer data (e.g., from cloud $\mathbf{172}_1$ and/or from cloud $\mathbf{172}_2$) is queued into an update queue 222 before being populated into the customer databases.

The personalization applications 212 can include a wide variety of applications including launch applications, web channel publishing applications, and user interface (UI) applications. For campaign preview and test links, and for web channel publishing applications, a UI serves to read personalization data and campaign metadata from customer databases. Data updates received by web channel applications are queued to the customer database and eventually get published to the cache through the data publisher. In the interim (e.g., after data updates are received by web channel applications and before they get published to the cache), updates can be populated into multiple caches (e.g., on both the primary and hot standby servers) so that they are immediately available for access. These personalization applications 212 can comprise one or more personalization engine instances.

The data delivery platform architecture 200 can be used to generate personalized messages in a plurality of marketing campaigns using data stored in a relational database (e.g., customer databases 168). One embodiment commences by parsing a message template (e.g., see marketing campaign templates 223) to identify commands (e.g., marketing campaign template commands 213) that invoke a data lookup operation over data found in selected tables (e.g., selected table1 $\mathbf{229}_1$, selected table2 $\mathbf{229}_2$,) that are stored in the relational database. The selected tables have one or more columns comprising instances of recipient IDs, one or more columns that hold external addresses (e.g., email aliases, SMS numbers, etc.), and one or more columns that hold demographic attributes corresponding to at least some of the recipient IDs. A process uses marketing campaign specifications to determine two or more data sources (e.g., columns) from the tables before performing a join operation over instances of the recipient IDs in the two or more data sources. The join operation results in a personalization table 231 comprising rows having at least the instances of recipient IDs, a respective external address, and at least one of the demographic attributes. A transformation function formats the personalization table into a key-value data structure, having the same number of entries as the personalization table, and publishes the resulting key-value data structure to a caching subsystem. Personalized messages are generated by selecting, from the key-value data structure to a caching subsystem, a first set of recipients based at least in part on a first one of the plurality of campaigns. As has been heretofore disclosed, a next campaign can be launched and processed without performing a second join operation by selecting, from the key-value data structure, a second set of recipients based at least in part on a second one of the plurality of campaigns, and personalized messages for the recipients are generated by using the message template and the key-value data structures transformed from the tables.

FIG. 3 is a flowchart depicting an approach 300 to processing multiple campaigns in parallel based on only one set of join operation results. As an option, one or more variations of approach 300 or any aspect thereof may be implemented in the context of the architecture and functionality of the embodiments described herein. Also, the approach 300 or any aspect thereof may be implemented in any environment.

As shown, the campaigns is specified (see step 302) and launched (see step 304). Based on the campaign specifications (see step 310) a filtering operation is run so as to target recipients (see step 308) that correspond to particular demographics. At that point, database operations can be performed to join personalization tables against all recipients (see step 310) and the results of the join operation or join operations are stored in an in-memory cache. Multiple personalization and send sets of operations (e.g., for multiple campaigns) can be run in parallel (e.g., see step 315$_1$, see step 315$_2$, see step 315$_3$). During the performance of the aforementioned multiple personalization and send sets of operations, the system can access the in-memory cache in the execution environment to retrieve personalization data, thus can significantly reduce the time taken to complete several campaigns.

Figure 4:
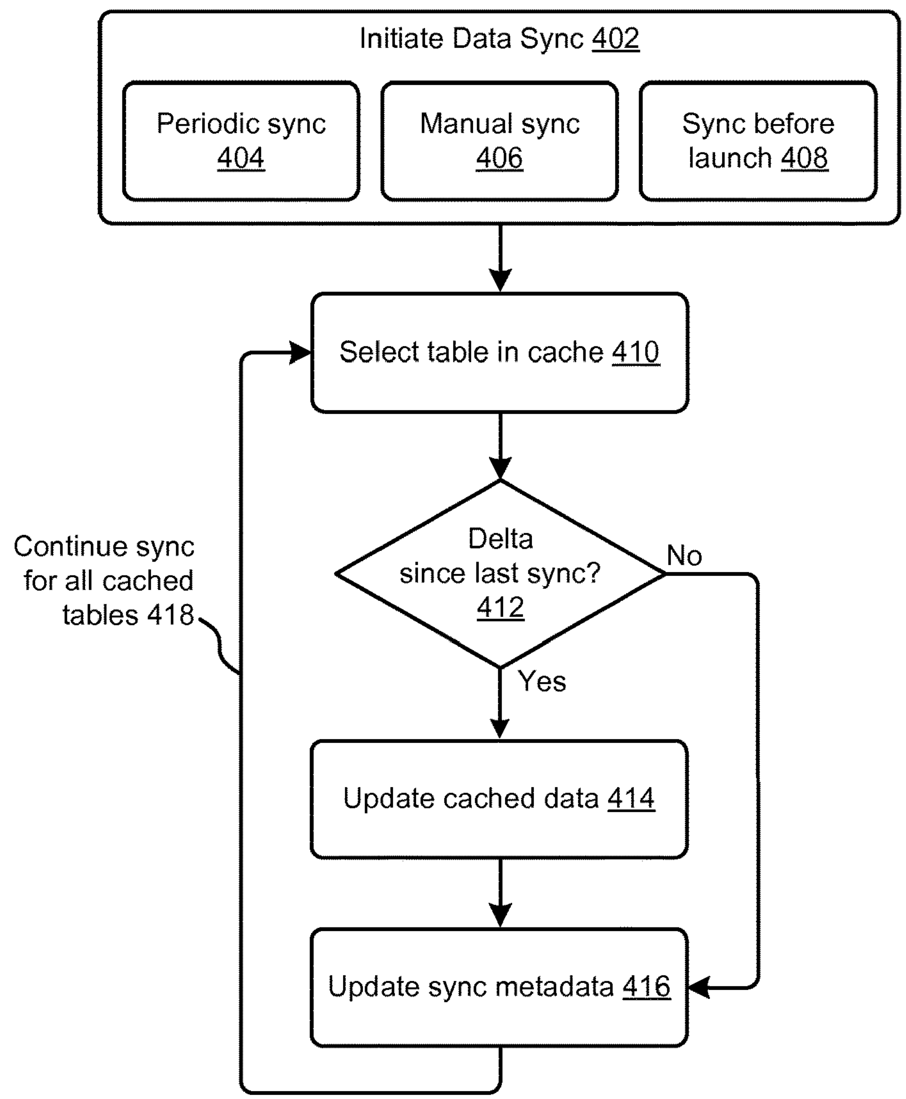
FIG. 4 illustrates an approach to perform data synchronization when exploiting asymmetric message personalization over multiple Internet messaging campaigns, according to an embodiment.

FIG. 4 illustrates an approach to perform data synchronization 400 when exploiting asymmetric message personalization over multiple Internet messaging campaigns. As an option, one or more variations of approach to perform data synchronization 400 or any aspect thereof may be implemented in the context of the architecture and functionality of the embodiments described herein. Also, the approach to perform data synchronization 400 or any aspect thereof may be implemented in any environment.

The flow begins with initiation of the data synchronization process (see step 402). There are many steps that can be taken to initiate the flow. One way is to establish a periodic schedule to perform the synchronization (see step 404). Another way is to allow the customer to manually initiate the sync process such as when the customer knows that a marketing campaign is about to be launched (see step 406). Yet another possible approach is to automatically perform the sync when the system determines that a campaign is about to be launched (see step 408).

The process then loops (see loop 418) through the sync operations for each table in the cache that needs to be synchronized. A table is selected (see operation 410), and a determination is made as to whether or not there is any delta between the contents of the cache and the data in the master database (see operation 412). If not then use the cached data (see operation 414). If there is any delta between the contents of the cache the data in the master database, then the cached is updated from the information in the master database (see operation 416), and the metadata for the cached data is updated to reflect the fact that a sync has occurred (e.g., by updating a timestamp).

FIG. 5 depicts a server mapping 500 used to exploit parallelism when performing asymmetric message personalization over multiple Internet messaging campaigns. As an option, one or more variations of server mapping 500 or any aspect thereof may be implemented in the context of the architecture and functionality of the embodiments described herein. Also, the server mapping 500 or any aspect thereof may be implemented in any environment.

The embodiment shown in FIG. 5 includes a collection of personalization data cache servers 502, which in turn comprises personalization data cache server PDC A 504$_1$, personalization data cache server PDC B 504$_2$, and personalization data cache server PDC C 504$_3$. Any servers from among the collection of personalization data cache servers can receive inputs from any one or more from among the shown collection of data publisher servers 506. The shown collection of data publisher servers includes an instance of customer data publisher 165$_4$ and an instance of customer data publisher 165$_5$, any of which can receive inputs from customer database servers 516.

As can be understood by those skilled in the art, any server or servers downstream from the personalization data cache servers 502 can access data from a cache rather than from the customer databases. For example, a collection of personalization servers 520 often includes one or more launch servers (e.g., launch servers 508$_1$, launch servers 508$_2$) and one or more publication servers (e.g., pubweb servers 510$_1$, pubweb servers 510$_2$).

The pubweb servers listen for HTTP requests from "click-through" events and initiate other actions on the basis of receiving the event. For example, a pubweb server can initiate the formation of links that are in turn sent out in messages for highly-targeted campaigns. The link that is clicked on by a recipient can cause a web page to be displayed in the user's browser. As such the web page(s) can be personalized. Pubweb servers are situated in the environment so as retrieve data from the personalization data cache servers.

Any server anywhere and/or in any collection of servers can access the metadata database 230, which may be implemented using one or more metadata servers 514.

The server mapping 500 can be used to implement a high-durability system of servers. One technique for high-availability and/or low downtime is to persist cached data periodically to a local non-volatile storage area so that cache servers can quickly restart and become fully operational after downtime or failure. Persisted data is only read on startup. Writes to the cache do not need to be fully ACID so long as the persisted data is consistent; missing writes due to a server failure are refreshed from customer databases. A pattern of asynchronous background snapshots of the cache to a local non-volatile storage area would serve to satisfy durability requirements.

Such durability can be mapped onto multi-tenant SaaS platforms. Cached data can be shared by accounts across a set of commodity servers of comprising a SaaS platform for achieving horizontal scalability. Customer data can be separated by account (e.g., with no sharing between accounts).

In addition to the aforementioned snapshot operations taken to persist cached data, metadata can be published to a metadata database. For example, metadata from customer databases can be published to a highly available implementation of the metadata database 230. Live link metadata generated during campaign execution can also be stored in the metadata database and can be replicated to the customer databases. Highly-available read access is provided through multiple hot standby servers which allow applications to transparently failover reads to a standby server without interruption to the service.

Additional Embodiments of the Disclosure

Additional Practical Application Examples

Figure 6:
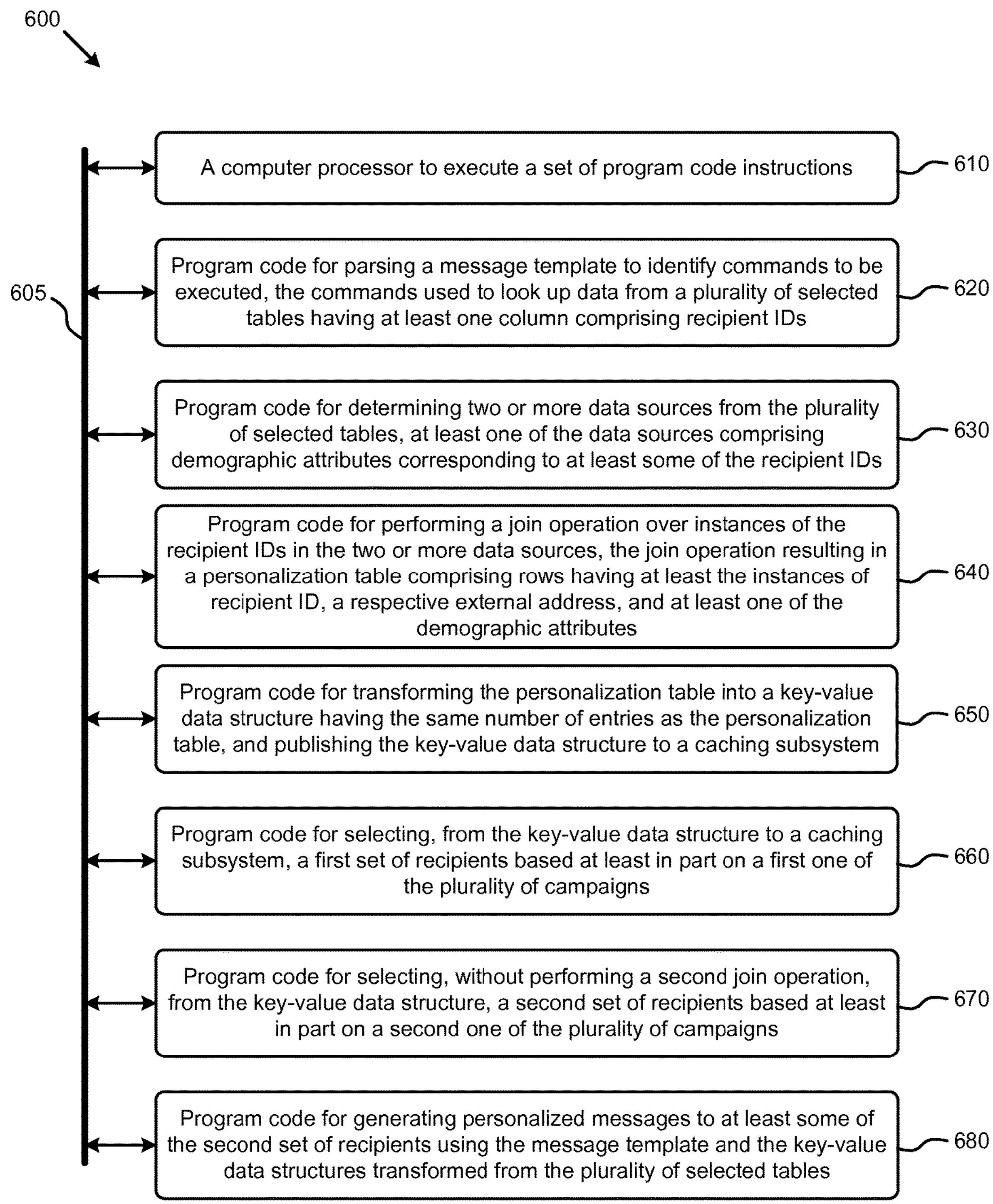
FIG. 6 depicts system components as an arrangement of computing modules that are interconnected so as to implement certain of the herein-disclosed embodiments.

FIG. 6 depicts a system 600 as an arrangement of computing modules that are interconnected so as to operate cooperatively to implement certain of the herein-disclosed embodiments. The partitioning of system 600 is merely illustrative and other partitions are possible. As an option, the present system 600 may be implemented in the context of the architecture and functionality of the embodiments described herein. Of course, however, the system 600 or any operation therein may be carried out in any desired environment. The system 600 comprises at least one processor and at least one memory, the memory serving to store program instructions corresponding to the operations of the system. As shown, an operation can be implemented in whole or in part using program instructions accessible by a module. The modules are connected to a communication path 605, and any operation can communicate with other operations over communication path 605. The modules of the system can, individually or in combination, perform method operations within system 600. Any operations performed within system 600 may be performed in any order unless as may be specified in the claims. The shown embodiment implements a portion of a computer system, presented as system 600, comprising a computer processor to execute a set of program code instructions (see module 610) and modules for accessing memory to hold program code instructions to perform: parsing a message template to identify commands to be executed, the commands used to look up data from a plurality of selected tables having at least one column comprising recipient IDs (see module 620); determining two or more data sources from the plurality of selected tables, at least one of the data sources comprising demographic attributes corresponding to at least some of the recipient IDs (see module 630); performing a join operation over instances of the recipient IDs in the two or more data sources, the join operation resulting in a personalization table comprising rows having at least the instances of recipient ID, a respective external address, and at least one of the demographic attributes (see module 640); transforming the personalization table into a key-value data structure having the same number of entries as the personalization table, and publishing the key-value data structure to a caching subsystem (see module 650); selecting, from the key-value data structure to a caching subsystem, a first set of recipients based at least in part on a first one of the plurality of campaigns (see module 660); selecting, without performing a second join operation, from the key-value data structure, a second set of recipients based at least in part on a second one of the plurality of campaigns (see module 670); and generating personalized messages to at least some of the second set of recipients using the message template and the key-value data structures transformed from the plurality of selected (see module 680).

System Architecture Overview

Additional System Architecture Examples

Figure 7:
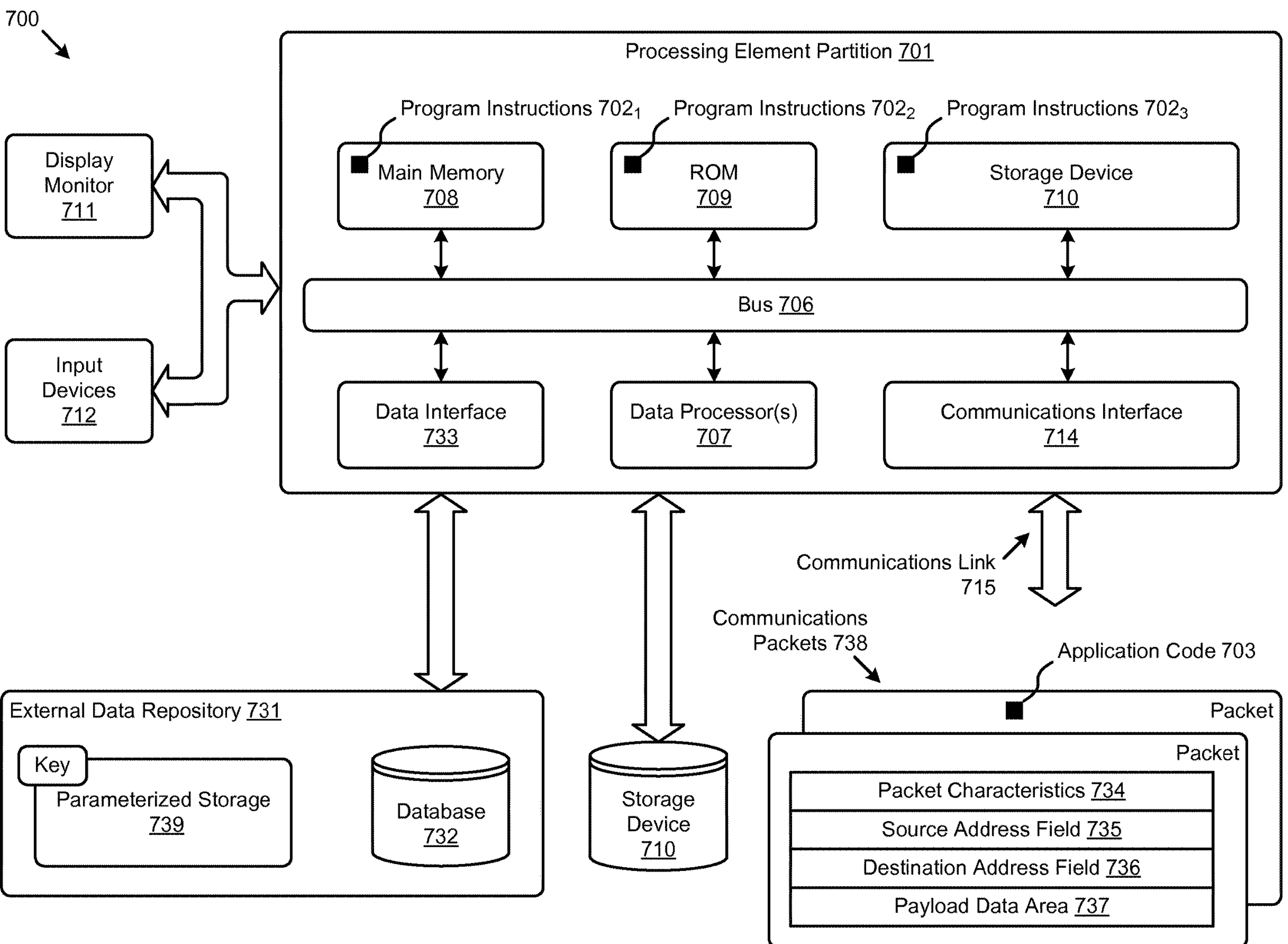
FIG. 7 depicts exemplary architectures of components suitable for implementing embodiments of the present disclosure, and/or for use in the herein-described environments.

FIG. 7 depicts a block diagram of an instance of a computer system 700 suitable for implementing embodiments of the present disclosure. Computer system 700 includes a bus 706 or other communication mechanism for communicating information. The bus interconnects subsystems and devices such as a CPU, or a multi-core CPU (e.g., data processor 707), a system memory (e.g., main memory 708, or an area of random access memory (RAM)), a non-volatile storage device or non-volatile storage area (e.g., read-only memory 709), an internal or external storage device 710 (e.g., magnetic or optical), a data interface 733, a communications interface 714 (e.g., PHY, MAC, Ethernet interface, modem, etc.). The aforementioned components are shown within processing element partition 701, however other partitions are possible. The shown computer system 700 further comprises a display 711 (e.g., CRT or LCD), various input devices 712 (e.g., keyboard, cursor control), and an external data repository 731.

According to an embodiment of the disclosure, computer system 700 performs specific operations by data processor 707 executing one or more sequences of one or more program code instructions contained in a memory. Such instructions (e.g., program instructions $\mathbf{702}_1$, program instructions $\mathbf{702}_2$, program instructions $\mathbf{702}_3$, etc.) can be contained in or can be read into a storage location or memory from any computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination therefrom.

According to an embodiment of the disclosure, computer system 700 performs specific networking operations using one or more instances of communications interface 714. Instances of the communications interface 714 may comprise one or more networking ports that are configurable (e.g., pertaining to speed, protocol, physical layer characteristics, media access characteristics, etc.) and any particular instance of the communications interface 714 or port thereto can be configured differently from any other particular instance. Portions of a communication protocol can be carried out in whole or in part by any instance of the communications interface 714, and data (e.g., packets, data structures, bit fields, etc.) can be positioned in storage locations within communications interface 714, or within system memory, and such data can be accessed (e.g., using random access addressing, or using direct memory access DMA, etc.) by devices such as data processor 707.

The communications link 715 can be configured to transmit (e.g., send, receive, signal, etc.) any types of communications packets 738 comprising any organization of data items. The data items can comprise a payload data area 737, a destination address 736 (e.g., a destination IP address), a source address 735 (e.g., a source IP address), and can include various encodings or formatting of bit fields to populate the shown packet characteristics 734. In some cases the packet characteristics include a version identifier, a packet or payload length, a traffic class, a flow label, etc. In some cases the payload data area 737 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term “logic” shall mean any combination of software or hardware that is used to implement all or part of the disclosure.

The term “computer readable medium” or “computer usable medium” as used herein refers to any medium that participates in providing instructions to data processor 707 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 731, which in turn can be formatted into any one or more storage areas, and which can comprise parameterized storage 739 accessible by a key (e.g., filename, table name, block address, offset address, etc.).

Execution of the sequences of instructions to practice certain embodiments of the disclosure are performed by a single instance of the computer system 700. According to certain embodiments of the disclosure, two or more instances of computer system 700 coupled by a communications link 715 (e.g., LAN, PTSN, or wireless network) may perform the sequence of instructions required to practice embodiments of the disclosure using two or more instances of components of computer system 700.

The computer system 700 may transmit and receive messages such as data and/or instructions organized into a data structure (e.g., communications packets 738). The data structure can include program instructions (e.g., application code 703), communicated through communications link 715 and communications interface 714. Received program code may be executed by data processor 707 as it is received and/or stored in the shown storage device or in or upon any other non-volatile storage for later execution. Computer system 700 may communicate through a data interface 733 to a database 732 on an external data repository 731. Data items in a database can be accessed using a primary key (e.g., a relational database primary key).

The processing element partition 701 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 707. Some embodiments include one or more special-purpose hardware components (e.g., power control, logic, sensors, transducers, etc.). A module may include one or more state machines and/or combinational logic used to implement or facilitate the performance characteristics of asymmetric message personalization over multiple Internet messaging campaigns.

Various implementations of the database 732 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of asymmetric message personalization over multiple Internet messaging campaigns). Such files or records can be brought into and/or stored in volatile or non-volatile memory.

Returning to discussion of the heretofore introduced environments, the environments includes components with which various systems can be implemented. Not all of the components shown may be required to practice the embodiments, and variations in the arrangement and type of the components may be made without departing from the spirit or scope of the disclosure.

Various environment in which embodiments of the disclosure operate may include local area networks (LANs)/wide area networks (WANs), wireless networks, client devices (e.g., user stations). The overall network, including any sub-networks and/or wireless networks, are in communication with, and enables communication between components in the environment.

Instances of client devices may include virtually any computing device capable of communicating over a network to send and receive information, including instant messages, performing various online activities or the like. It should be recognized that more or fewer client devices may be included within a system such as described herein, and embodiments are therefore not constrained by the number or type of client devices employed.

Devices that may operate as client devices may include devices that can connect using a wired or wireless communications medium such as personal computers, servers, multiprocessor systems, microprocessor-based or programmable consumer electronics, network PCs or the like. In some embodiments, client devices may include virtually any portable computing device capable of connecting to another computing device and receiving information such as a laptop computer, a smart phone, a tablet computer, or the like. Portable or mobile computer devices are may also include or operate in conjunction with other portable devices such as cellular telephones, display pagers, radio frequency (RF) devices, infrared (IR) devices, personal digital assistants (PDAs), handheld computers, wearable computers integrated devices combining one or more of the preceding devices and the like. As such, client devices can range widely in terms of capabilities and features. Moreover, client devices may provide access to various computing applications including a browser or other web-based applications. A web-enabled client device may include a browser application that is configured to receive and to send web pages, web-based messages and the like. The browser application may be configured to receive and display graphics, text, multimedia and the like, employing virtually any web-based language including a wireless application protocol messages (WAP) and the like. In certain embodiments, the browser application is enabled to employ handheld device markup language (HDML), wireless markup language (WML), WMLScript, JavaScript, standard generalized markup language (SGML), HyperText markup language (HTML), eXtensible markup language (XML) and the like, to display and send a message. In certain embodiments, a user of the client device may employ the browser application to perform various activities over a network (online). However, another application may also be used to perform various online activities.

Client devices may include at least one client application that is configured to receive and/or send data between other computing devices (e.g., server components). The client application may include a capability to provide send and/or receive content or the like. The client application may further provide information that identifies itself including a type, capability, name or the like. In certain embodiments, a client device may uniquely identify itself through any of a variety of mechanisms including a phone number, mobile identification number (MIN), an electronic serial number (ESN), or other mobile device identifier. The information may also indicate a content format that the mobile device is enabled to employ. Such information may be provided in a network packet or the like, sent between other client devices, or sent between other computing devices.

Client devices may be further configured to include a client application that enables an end-user to log into an end-user account that may be managed by another computing device. Such end-user accounts, in one non-limiting example, may be configured to enable the end-user to manage one or more online activities including, in one non-limiting example, search activities, social networking activities, browse various websites, communicate with other users, participate in gaming, interact with various applications or the like. However, participation in online activities may also be performed without logging into the end-user account.

A wireless communication capability is configured to couple client devices and other components with network. Wireless network may include any of a variety of wireless sub-networks that may further overlay stand-alone and/or ad-hoc networks and the like, to provide an infrastructure-oriented connection for client devices. Such sub-networks may include mesh networks, wireless LAN (WLAN) networks, cellular networks and the like. In certain embodiments, the system may include more than one wireless network.

A wireless network may further include an autonomous system of terminals, gateways, routers, mobile network edge devices and the like which may be connected by wireless radio links, etc. Connections may be configured to move freely and randomly and organize themselves arbitrarily such that the topology of a wireless network may change rapidly. A wireless network may further employ a plurality of access technologies including AMPS and/or second generation (2G), and/or third generation (3G), and/or fourth generation (4G) generation radio access for cellular systems, WLAN, wireless router (WR) mesh and the like. The foregoing access technologies as well as emerging and/or future access technologies may enable wide area coverage for mobile devices such as client devices with various degrees of mobility. In one non-limiting example, wireless network may enable a radio connection through a radio network access such as a global system for mobile (GSM) communication, general packet radio services (GPRS), enhanced data GSM environment (EDGE), wideband code division multiple access (WCDMA) and the like. A wireless network may include any wireless communication mechanism by which information may travel between client devices and/or between any other computing devices and/or over or between other networks or network components.

Any of the foregoing networks can be configured to couple network devices with other computing devices and communication can include communicating over the Internet. In some situations communication is carried out using combinations of LANs, WANs, as well as direct connections such as through a universal serial bus (USB) port, other forms of computer readable media. On an interconnected set of LANs, including those based on differing architectures and protocols, a router acts as a link between LANs, enabling messages to be sent from one to another. In addition, communications links within LANs may include twisted wire pair or coaxial cable, while communications links between networks may use analog telephone lines, full or fractional dedicated digital lines including T1, T2, T3, and T4, and/or other carrier mechanisms including, for example, E-carriers, integrated services digital networks (ISDNs), digital subscriber lines (DSLs), wireless links including satellite links, or other communications links known to those skilled in the art. Moreover, communications links may further employ any of a variety of digital signaling technologies including, without limit, for example, DS-0, DS-1, DS-2, DS-3, DS-4, OC-3, OC-12, OC-48 or the like. Furthermore, remote computers and other related electronic devices can be remotely connected to either LANs or WANs via a modem and temporary telephone link. In various embodiments, a network may be configured to transport information of an Internet protocol (IP). In some cases, communication media carries computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings to be regarded in an illustrative sense rather than in a restrictive sense.

What is claimed is:

1. A computer implemented method of performing a personalization of a message on a multi-tenant software as a service platform to generate personalized messages for a plurality of different sets of data in different relational database tables based on filter criteria, comprising:

parsing a message template that includes commands to identify the commands from within the message template to be executed, the commands used to look up data from a plurality of the different tables having at least one column comprising shared keys;

determining two or more columns from the plurality of the different tables, at least one of the two or more columns comprising attributes corresponding to at least some of the shared keys;

performing a single join operation over the shared keys in the two or more columns, the single join operation resulting in a relational database personalization table having multiple entries stored in corresponding rows, an entry of the multiple entries corresponding to a primary key in a primary key column and a plurality of data fields and comprising;

rows having at least the shared keys, a respective external address, and at least one of the attributes;

applying a transformation function to a result of the single join operation to transform the personalization table into a key-value data structure having the same number of rows as the personalization table, the key-value data structure storing a primary key of the personalization table as a key of the key-value data structure, and the respective external address and the at least one of the attributes from the personalization table in a value field of the key-value data structure, wherein the transform comprises, for each entry of the multiple entries, retaining the primary key of the personalization table as a look-up key for the key-value data structure, and encoding two or more of the plurality of data fields into a single value in a single-value field in the key-value data structure, wherein the key-value data structure comprises, for each entry of the multiple entries, a respective primary key and a corresponding single value;

storing the key-value data structure to a caching subsystem that publishes the key-value data for read-only access;

generating a preview of a personalized message without using the key-value data in the caching subsystem;

selecting, from the key-value data structure stored in the caching subsystem, a first set of data rows based at least in part on a first attribute;

selecting from the key-value data structure stored in the caching subsystem, without performing a second join operation over the shared keys in the two or more columns or otherwise re-performing the join operation, a second set of data rows based on a second attribute; and generating personalized messages addressed to at least some recipients corresponding to the second attribute using the message template and the key-value data structures transformed from the plurality of the different tables.

2. The method of claim 1, further comprising:

selecting, without performing a second join operation, from the key-value data structure, a third set of recipients; and generating personalized messages to at least some of the third set of recipients using the message template and the key-value data structures transformed from the tables, wherein the multi-tenant software as the service platform complies with a service level agreement (SLA) that requires generating a predefined number of personalized messages per minute.

3. The method of claim 2, wherein generating personalized messages to at least some recipients corresponding to the second attribute using the message template and the key-value data structures transformed from the tables is performed in parallel with generating personalized messages to at least some of recipients corresponding to the first set of data rows using the message template and the key-value data structures transformed from the tables.

4. The method of claim 1, further comprising an incremental join and publish operation.

5. The method of claim 1, further comprising performing continuous incremental join and publish operations to update personalization tables in the caching subsystem.

6. The method of claim 1, wherein the two or more columns comprise a first column having at least some email addresses and a second column having at least some SMS addresses.

7. The method of claim 1, wherein the personalized messages are generated without accessing the personalization tables from which the key-value data structures had been transformed.

8. The method of claim 1, wherein a count of the different tables from which the commands to be executed are used to look up data is equal to a count of the key-value data structures transformed from the tables and the encoding comprises binary encoding.

9. The method of claim 1, wherein at least some of the commands within the message template are name lookup commands.

10. The method of claim 1, wherein the different tables of the database are stored in persistent memory and the key-value data structures transformed therefrom are stored in volatile memory.

11. A computer program product, embodied in a non-transitory computer readable medium, the non-transitory computer readable medium having stored thereon a sequence of instructions which, when stored in memory and executed by a processor causes the processor to perform a computer implemented method of performing a personalization of a message on a multi-tenant software as a service platform to generate personalized messages for a plurality of different sets of data in different relational database tables based on filter criteria, the method comprising:

parsing a message template that includes commands to identify the commands from within the message template to be executed, the commands used to look up data from a plurality of the different tables having at least one column comprising shared keys;

determining two or more columns from the plurality of the different tables, at least one of the two or more columns comprising attributes corresponding to at least some of the shared keys;

performing a single join operation over the shared keys in the two or more columns, the single join operation resulting in a relational database personalization table having multiple entries stored in corresponding rows, an entry of the multiple entries corresponding to a primary key in a primary key column and a plurality of data fields and comprising;

rows having at least the shared keys, a respective external address, and at least one of the attributes;

applying a transformation function to a result of the single join operation to transform the personalization table into a key-value data structure having the same number of rows as the personalization table, the key-value data structure storing a primary key of the personalization table as a key of the key-value data structure, and the respective external address and the at least one of the attributes from the personalization table in a value field of the key-value data structure, wherein the transform comprises, for each entry of the multiple entries, retaining the primary key of the personalization table as a look-up key for the key-value data structure, and encoding two or more of the plurality of data fields into a single value in a single-value field in the key-value data structure, wherein the key-value data structure comprises, for each entry of the multiple entries, a respective primary key and a corresponding single value;

storing the key-value data structure to a caching subsystem that publishes the key-value data for read-only access;

generating a preview of a personalized message without using the key-value data in the caching subsystem;

selecting, from the key-value data structure stored in the caching subsystem, a first set of data rows based at least in part on a first attribute;

selecting from the key-value data structure stored in the caching subsystem, without performing a second join operation over the shared keys in the two or more columns or otherwise re-performing the join operation, a second set of data rows based on a second attribute; and generating personalized messages addressed to at least some recipients corresponding to the second attribute using the message template and the key-value data structures transformed from the plurality of the different tables.

12. The computer program product of claim 11, further comprising instructions to perform:

selecting, without performing a second join operation, from the key-value data structure, a third set of recipients; and generating personalized messages to at least some of the third set of recipients using the message template and the key-value data structures transformed from the tables, wherein the multi-tenant software as the service platform complies with a service level agreement (SLA) that requires generating a predefined number of personalized messages per minute.

13. The computer program product of claim 12, wherein generating personalized messages to at least some recipients corresponding to the second attribute using the message template and the key-value data structures transformed from the tables is performed in parallel with generating personalized messages to at least some of recipients corresponding to the first set of data rows using the message template and the key-value data structures transformed from the tables.

14. The computer program product of claim 11, further comprising instructions to perform an incremental join and publish operation.

15. The computer program product of claim 11, further comprising instructions to perform continuous incremental join and publish operations to update personalization tables in the caching subsystem.

16. The computer program product of claim 11, wherein the two or more columns comprise a first column having at least some email addresses and a second column having at least some SMS addresses.

17. The computer program product of claim 11, wherein at least some of the commands within the message template are name lookup commands.

18. The computer program product of claim 11, wherein the different tables of the database are stored in persistent memory and the key-value data structures transformed therefrom are stored in volatile memory and the encoding comprises binary encoding.

19. A system in a multi-tenant software as a service platform configured to generate personalized messages for a plurality of different sets of data in different relational database tables in a database based on filter criteria, the system comprising:

a channel engine to parse a message template that includes commands to identify the commands from within the message template to be executed, the commands used to look up data from a plurality of the different relational database tables having at least one column comprising shared keys;

a data publisher module configured to perform acts of:

determining two or more columns from the plurality of the different tables, at least one of the two or more columns comprising attributes corresponding to at least some of the shared keys;

performing a single join operation over the shared keys in the two or more columns, the single join operation resulting in a personalization table having multiple entries stored in corresponding rows, an entry of the multiple entries corresponding to a primary key in a primary key column and a plurality of data fields and comprising:

rows having at least the shared keys, a respective external address, and at least one of the attributes;

applying a transformation function to a result of the single join operation to transform the personalization table into a key-value data structure having the same number of rows as the personalization table, the key-value data structure storing a primary key of the personalization table as a key of the key-value data structure, and the respective external address and the at least one of the attributes from the personalization table in a value field of the key-value data structure, wherein the transform comprises, for each entry of the multiple entries, retaining the primary key of the personalization table as a look-up key for the key-value data structure, and binary encoding two or more of the plurality of data fields into a single value in a single-value field in the key-value data structure, wherein the key-value data structure comprises, for each entry of the multiple entries, a respective primary key and a corresponding single value;

storing the key-value data structure to a caching subsystem that publishes the key-value data for read-only access; and generating a preview of a personalized message without using the key-value data in the caching subsystem;

the caching subsystem configured to select, from the key-value data structure stored in the caching subsystem, without performing a second join operation over the shared keys in the two or more columns or otherwise re-performing the join operation, a second set of data rows based on a second attribute; and a personalization application module configured to generate personalized messages addressed to at least recipients corresponding to the second attribute using the message template and the key-value data structures transformed from the plurality of the different tables.

20. The system of claim 19, wherein at least some of the commands within the message template are name lookup commands, and the multi-tenant software as the service platform complies with a service level agreement (SLA) that requires generating a predefined number of personalized messages per minute.

* * * * *